US010821665B2

(12) United States Patent
Sterman et al.

(10) Patent No.: US 10,821,665 B2
(45) Date of Patent: Nov. 3, 2020

(54) SPRING-LOADED NOZZLE ASSEMBLIES

(71) Applicant: NIKE, Inc., Beaverton, OR (US)

(72) Inventors: Yoav Sterman, Portland, OR (US); Todd A. Waatti, Battle Ground, WA (US)

(73) Assignee: NIKE, Inc., Beaverton, OR (US)

(*) Notice: Subject to any disclaimer, the term of this patent is extended or adjusted under 35 U.S.C. 154(b) by 705 days.

(21) Appl. No.: 15/622,933

(22) Filed: Jun. 14, 2017

(65) Prior Publication Data
US 2017/0355142 A1 Dec. 14, 2017

Related U.S. Application Data

(60) Provisional application No. 62/350,040, filed on Jun. 14, 2016.

(51) Int. Cl.
B29C 64/236 (2017.01)
B29C 64/112 (2017.01)
B33Y 30/00 (2015.01)
B29C 64/106 (2017.01)
B29C 48/265 (2019.01)
B29C 64/118 (2017.01)
B29C 64/209 (2017.01)
B29L 31/50 (2006.01)

(52) U.S. Cl.
CPC .......... B29C 64/236 (2017.08); B29C 48/265 (2019.02); B29C 64/106 (2017.08); B29C 64/112 (2017.08); B29C 64/118 (2017.08); B29C 64/209 (2017.08); B33Y 30/00 (2014.12); B29L 2031/50 (2013.01)

(58) Field of Classification Search
CPC ... B29C 64/236; B29C 64/118; B29C 64/209; B29C 48/265; B29C 64/106; B29C 64/112; B33Y 30/00; B29L 2031/50
See application file for complete search history.

(56) References Cited

U.S. PATENT DOCUMENTS

| 2,623,452 A | 12/1952 | Emerson |
| 3,961,575 A | 6/1976 | Rodabaugh |
| 4,803,922 A | 2/1989 | Dennesen et al. |
| 6,406,200 B2 | 6/2002 | Mahoney |
| 7,047,877 B2 | 5/2006 | Powney et al. |
| 7,784,776 B2 | 8/2010 | Pechtl et al. |

(Continued)

FOREIGN PATENT DOCUMENTS

| CN | 204149532 | 2/2015 |
| DE | 102006047999 | 4/2008 |

(Continued)

OTHER PUBLICATIONS

International Search Report and Written Opinion, dated Oct. 9, 2017, for corresponding International Patent Application No. PCT?US2017/037433, 14 pages.

Primary Examiner — Nahida Sultana
(74) Attorney, Agent, or Firm — Klarquist Sparkman, LLP

(57) ABSTRACT

A printing system includes a printing assembly and a gas delivery system includes a gas nozzle assembly. The print assembly and gas nozzle assembly may include a first portion and a second portion that may translate with respect to each other. When the first portion is subjected to a sufficient force the first portion may translate with respect to the second portion.

21 Claims, 18 Drawing Sheets

(56) References Cited

U.S. PATENT DOCUMENTS

| | | | |
|---|---|---|---|
| 8,287,959 B2* | 10/2012 | Batchelder | B29C 64/106 |
| | | | 427/256 |
| 9,085,109 B2* | 7/2015 | Schmehl | B29C 48/02 |
| 10,254,499 B1* | 4/2019 | Cohen | B33Y 70/00 |
| 10,391,695 B2* | 8/2019 | Douglass | B29C 48/832 |
| 2010/0166969 A1* | 7/2010 | Batchelder | B29C 64/106 |
| | | | 427/402 |
| 2014/0232802 A1 | 8/2014 | Bitoh | |
| 2014/0322383 A1 | 10/2014 | Rutter | |
| 2015/0040428 A1 | 2/2015 | Davis et al. | |
| 2016/0257051 A1* | 9/2016 | Pappas | B29C 48/865 |
| 2017/0190109 A1* | 7/2017 | Holland | B29C 64/336 |
| 2018/0056608 A1* | 3/2018 | Dunn | B29C 64/209 |
| 2019/0091929 A1* | 3/2019 | Harrison | B29C 48/30 |
| 2019/0204811 A1* | 7/2019 | Adair | B23K 26/1482 |
| 2019/0375141 A1* | 12/2019 | Armijo | B29C 48/05 |
| 2020/0061911 A1* | 2/2020 | Kettelarij | B29C 64/209 |
| 2020/0189191 A1* | 6/2020 | Van Deest | B29C 64/153 |

FOREIGN PATENT DOCUMENTS

| | | |
|---|---|---|
| WO | WO 2008/130489 | 10/2008 |
| WO | WO 2015/073367 | 5/2015 |

* cited by examiner

SPRING-LOADED NOZZLE ASSEMBLIES

CROSS REFERENCE TO RELATED APPLICATION

This application claims the benefit of U.S. Provisional Application No. 62/350,040, filed Jun. 14, 2016, which is incorporated by referenced in its entirety.

BACKGROUND

The present embodiments relate generally to three-dimensional printing systems and methods.

Three-dimensional printing systems and methods may be associated with various technologies including fused deposition modeling (FDM), electron beam freeform fabrication (EBF), and selective laser sintering (SLS), as well as other kinds of three-dimensional printing technologies.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
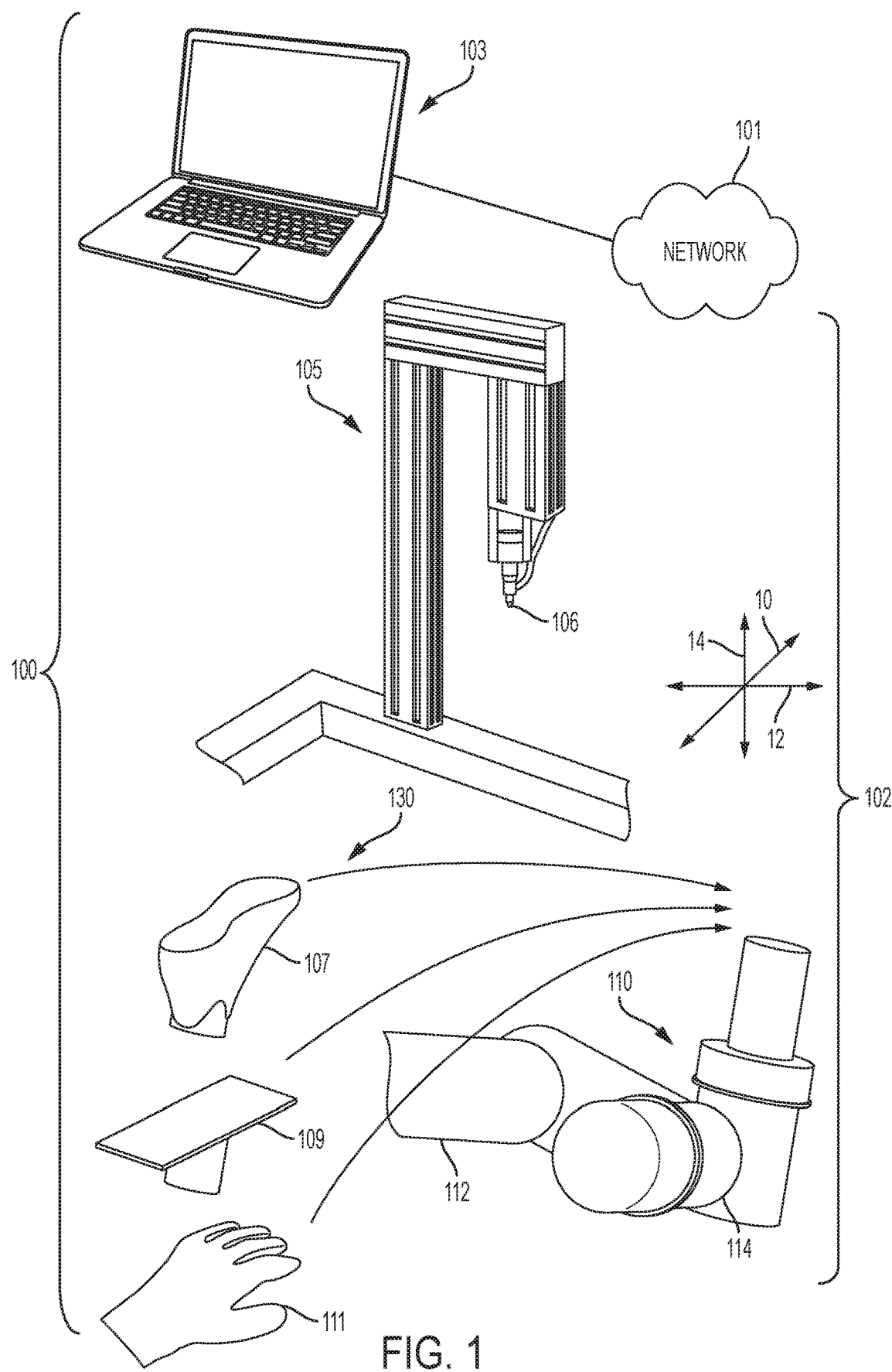
FIG. 1 is a schematic view of an embodiment of components of a three-dimensional printing system as well as a plurality of article receiving devices.

FIG. 1 is a schematic view of an embodiment of a three-dimensional printing system 100 also referred to simply as printing system 100 hereafter. FIG. 1 also illustrates several exemplary article receiving devices 130 that may be used with printing system 100. Referring to FIG. 1, printing system 100 may further comprise printing device 102, computing system 103, and network 101.

Embodiments may use various kinds of three-dimensional printing (or additive manufacturing) techniques. Three-dimensional printing, or "3D printing," comprises various technologies that are used to form three-dimensional objects by depositing successive layers of material on top of one another. Exemplary 3D printing technologies that could be used include, but are not limited to: fused filament fabrication (FFF), electron beam freeform fabrication (EBF), direct metal laser sintering (DMLS), electron beam melting (EMB), selective laser melting (SLM), selective heat sintering (SHS), selective laser sintering (SLS), plaster-based 3D printing (PP), laminated object manufacturing (LOM), stereolithography (SLA), digital light processing (DLP), as well as various other kinds of 3D printing or additive manufacturing technologies know in the art.

In the embodiments shown in the figures, printing system 100 may be associated with fused filament fabrication (FFF), also referred to as fused deposition modeling. In the embodiment shown in FIG. 1, printing device 102 of printing system 100 may use fused filament fabrication to produce three-dimensional parts.

Figure 2:
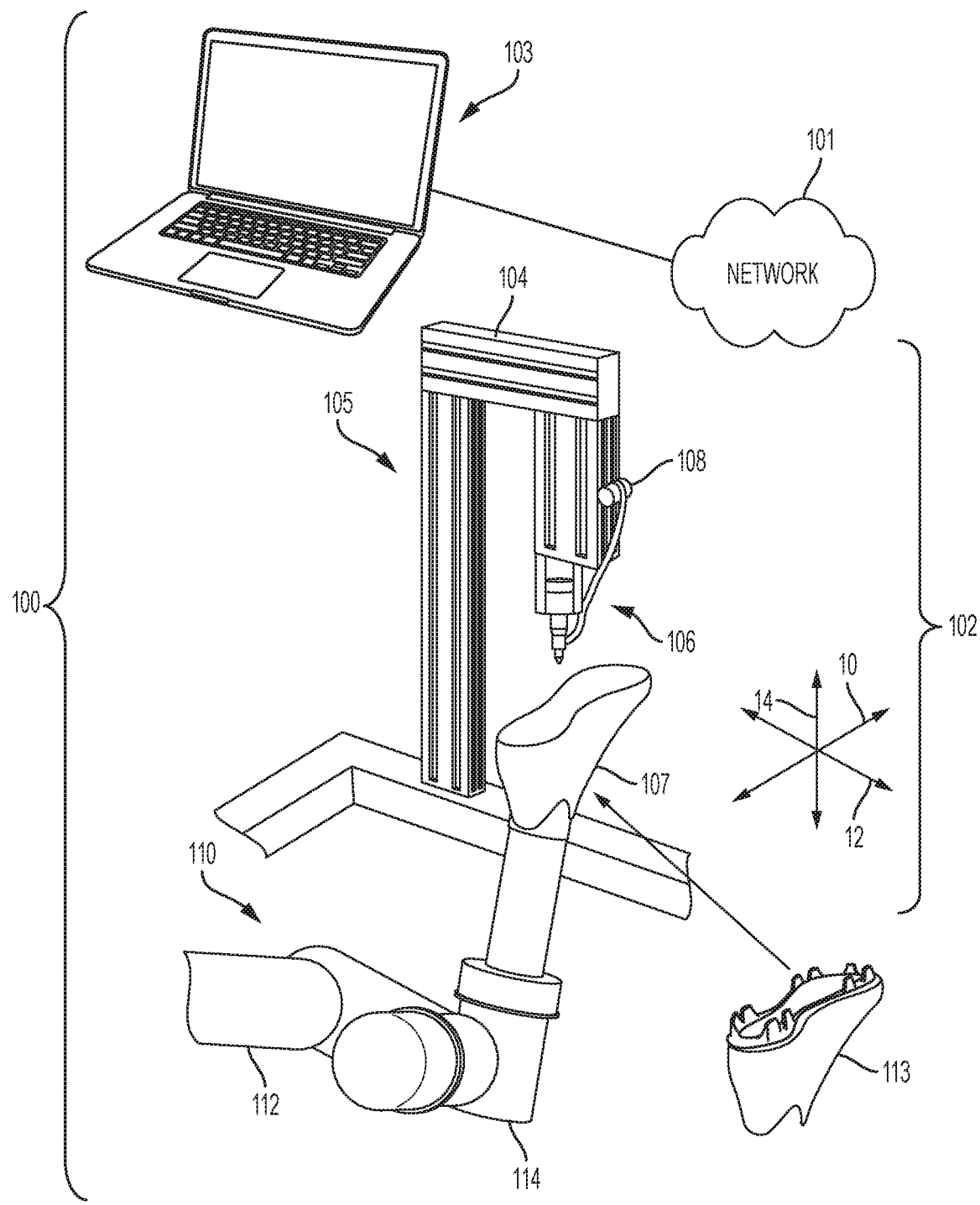
FIG. 2 is a schematic view of an embodiment of a printing system with a mounted footwear receiving device.

Printing device 102 may include print application device 105 and article translating device 110. In some embodiments, article translating device 110 may be configured to receive various article receiving devices 130. Additionally, in some embodiments, article translating device 110 may be configured to translate along various axes and rotate about various axes. Further description detailing the movement of article translating device 110 is discussed below. In some embodiments, print application device 105 may include one or more systems, devices, assemblies, or components for delivering a printed material (or printed substance) to a target location. Target locations could include locations that are attached to article translating device 110. Provisions for delivering printed material may include, for example, print heads and nozzles. In the embodiment of FIGS. 1 and 2, print application device further includes printing assembly 106.

In some embodiments, article translating device 110 may include provisions to retain or hold an object, or a component supporting the object. In some embodiments, article translating device 110 may include provisions to receive one of article receiving devices 130. Article receiving devices 130 may have many different shapes and sizes. In some embodiments, article receiving devices 130 may be configured to receive an article of a particular shape. In other embodiments, article receiving devices may include a platform to allow for an object to be secured to the platform.

In some embodiments, each device of article receiving devices 130 may be interchangeable. In some embodiments, a receiving device may be configured to receive an article of footwear while other receiving devices may be configured to receive a glove. As shown, footwear receiving device 107 may be configured to receive an article of footwear. Additionally, platform receiving device 109 may be configured to receive articles of various shapes and sizes. Further, in some embodiments, platform receiving device 109 may be used as a substrate to receive printed material. Various other shaped receiving devices such as glove receiving device 111 may be utilized to receive other articles of various shapes.

In some embodiments, article translating device 110 may be configured to rotate about or translate along various axes. In some embodiments, article translating device 110 may be able to translate about X axis 10, Y axis 12, and Z axis 14. Additionally, article translating device 110 may be able to rotate about X axis 10, Y axis 12, and Z axis 14. That is, article translating device 110 may have six degrees of freedom. In some embodiments, article translating device 110 may be a six axis robot with six degrees of freedom. In other embodiments, article translating device 110 may be stationary or may be able to rotate about or translate along, one or more axes.

In some embodiments, article translating device 110 may include a base 112 and an arm 114. In some embodiments, arm 114 may be able to rotate with respect to base 112. In some embodiments, arm 114 may be able to rotate about X axis 10, Y axis 12, and Z axis 14. In some embodiments, arm 114 may be able to translate with respect to base 112. In some embodiments, arm 114 may be able to translate along X axis 10, Y axis 12, and Z axis 14. In other embodiments, arm 114 may be able to rotate about or translate along, one or more of X axis 10, Y axis 12, and Z axis 14 with respect to base 112. In such a configuration, an article receiving device may be able to rotate about or translate along, one or more of X axis 10, Y axis 12, and Z axis 14. It is therefore contemplated that in at least some embodiments, the article receiving device may be moved to any desired relative configuration with respect to printing assembly 106 and print application device 105.

In some embodiments, print application device 105 may be configured to deposit a print material onto an article secured to article translating device 110. In some embodiments, print application device 105 may be configured to deposit a print material directly onto an article receiving device such as platform receiving device 109. In other embodiments, print application device 105 may deposit a print material onto an article that is secured to an article receiving device or to an article that is placed upon an article receiving device.

In some embodiments, print application device 105 may include various systems or devices such as arm 104 that supports a printing assembly 106. In some embodiments, arm 104 may be able to twist, rotate, and translate such that printing assembly has six degrees of freedom. That is, arm 104 may be able to twist about X axis 10, Y axis, 12, and Z axis 14. Additionally, arm 104 may be able to translate along the X axis 10, Y axis 12, and Z axis 14. That is, in some embodiments arm 104 has six degrees of freedom. In some embodiments, print application device may be a six axis robot that has six degrees of freedom. In other embodiments, arm 104 may be stationary or may be able to rotate about or translate along, one or more axes. In some embodiments, arm 104 may further support other devices such as spool 108. Spool 108 may support or store thread or another medium that is used for printing. Spool 108 and the relationship of spool 108 to arm 104 and printing system 100 will be discussed in further detail in this Detailed Description.

In some embodiments, the various components of printing system 100 may work in conjunction with each other to form a printed article or to print upon an article. In some embodiments, computing system 103 may utilize network 101 to communicate with print application device 105 and article translating device 110. In other embodiments, computing system 103 may directly communicate with print application device 105 and article translating device 110. In each of the embodiments, print application device 105 may be programmed to deposit a print material along a given path. As printing assembly 106 deposits a print material, article translating device 110 may rotate or translate to position the print material along an article or article receiving device. Additionally, as discussed previously above, in some embodiments, article translating device 110 may remain stationary while print application device 105 translates. In still further embodiments, both of article translating device 110 and print application device may translate or rotate as print material is deposited.

Referring now to FIG. 2, article translating device 110 includes footwear receiving device 107. In some embodiments, footwear receiving device 107 may be similar in shape and size to a last. In other embodiments, footwear receiving device 107 may have other shapes to support an article of footwear. In some embodiments, article of footwear 113 may be secured to footwear receiving device 107 by inserting footwear receiving device 107 in article of footwear 113. After article of footwear 113 is secured onto footwear receiving device 107, print material may be deposited on article of footwear 113. Although depicted in the Figures as being oriented such that the sole structure of article of footwear 113 is facing towards print assembly 106, in other embodiments, article of footwear 113 may be oriented such that the upper or another portion of article of footwear 113 is oriented toward print assembly 106.

Figure 3:
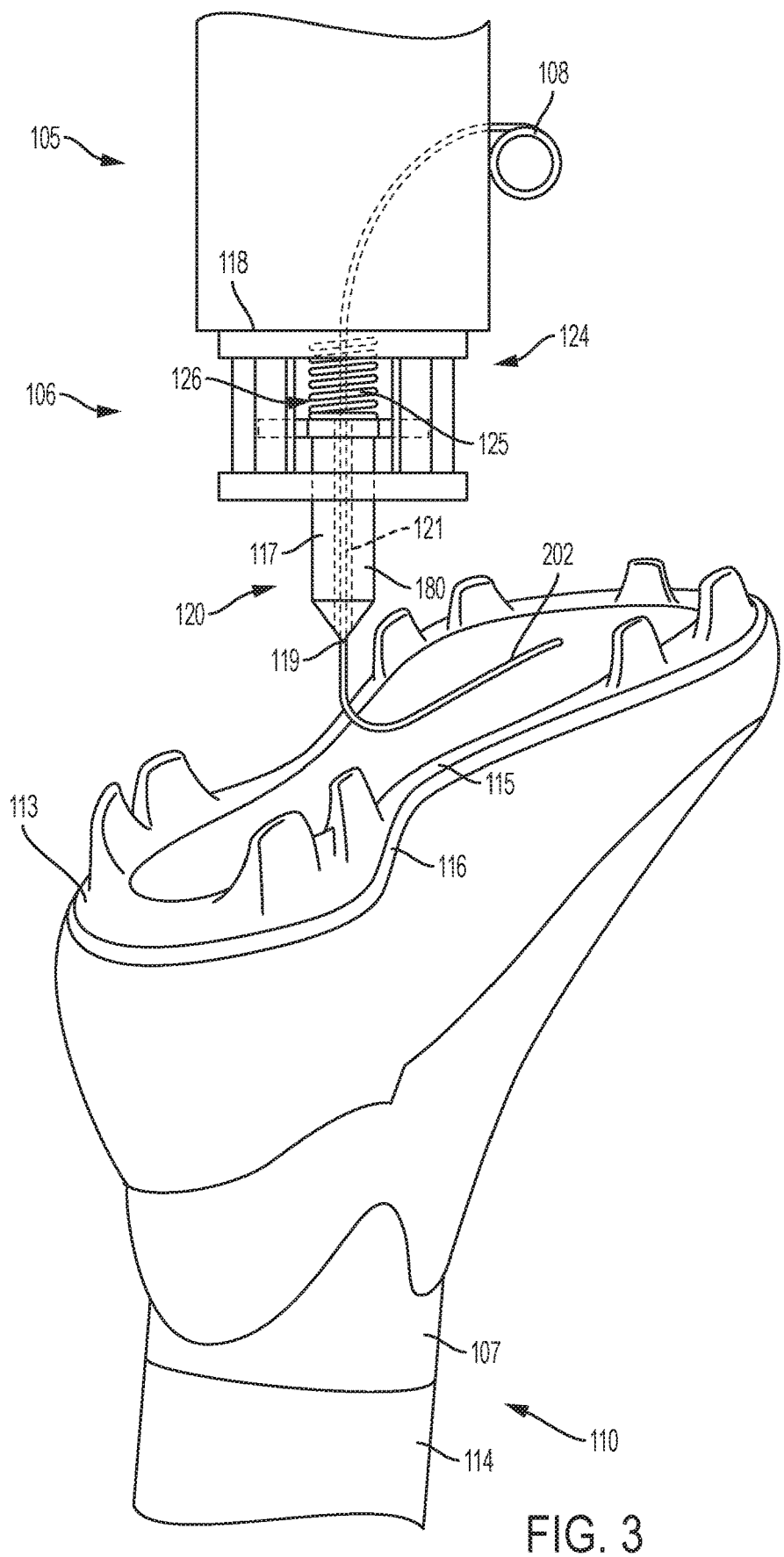
FIG. 3 is a schematic view of a printing assembly applying a print material onto an article.

In some embodiments, a printing assembly may include a nozzle for depositing print material. As shown in FIG. 3, printing assembly 106 includes printhead 120 that includes nozzle 117. In some embodiments, printhead 120 may also include retaining portion 123 that may restrict motion of printhead 120 along certain axes. In some embodiments, printing assembly 106 may include one or more printheads that deliver a print material to a target location. As shown, printing assembly 106 includes a single printhead 120. In other embodiments, multiple printheads may be utilized and arranged in any particular configuration. In embodiments comprising two or more printheads, the printheads could be configured to move together or independently from one another.

In some embodiments, the nozzle of the printhead may be configured with a nozzle aperture that can be open or closed to regulate and control the flow of material exiting from the nozzle. For example, nozzle 117 may include nozzle aperture 119. In some embodiments, nozzle channel 121 may extend along the length of nozzle 117 or printhead 120. In other embodiments, nozzle channel 121 may extend through a side surface of nozzle 117. In some embodiments, nozzle aperture 119 may be in fluid communication with nozzle channel 121 that receives a supply of material from a material source within printing device 102.

In some embodiments, a worm-drive may be used to push the filament into printhead 120 at a specific rate (which may be varied to achieve a desired volumetric flow rate of material from printhead 120). In other embodiments, a worm-drive is omitted. For example, the material may be pulled from printhead 120 using an actuating system. It will be understood that in some cases, the supply of material could be provided at a location near printhead 120 (e.g., in a portion of printing assembly 106), while in other embodiments the supply of material could be located at some other location of printing device 102 and fed via tubes, conduits, or other provisions, to printhead 120.

As discussed above, printing system 100 can include provisions to control and/or receive information from printing device 102. These provisions can include a computing system 103 and a network 101. Generally, the term "computing system" refers to the computing resources of a single computer, a portion of the computing resources of a single computer, and/or two or more computers in communication with one another. Any of these resources can be operated by one or more human users. In some embodiments, computing system 103 may include one or more servers. In some cases, a print server may be primarily responsible for controlling and/or communicating with printing device 102, while a separate computer (e.g., desktop, laptop, or tablet) may facilitate interactions with a user. Computing system 103 can also include one or more storage devices including but not limited to magnetic, optical, magneto-optical, and/or memory, including volatile memory and non-volatile memory.

In the exemplary embodiment of FIG. 1, computing system 103 may comprise a central processing device, a viewing interface (e.g., a monitor or screen), input devices (e.g., keyboard and mouse), and software for designing a computer-aided design ("CAD") representation of a printed structure. In at least some embodiments, the CAD representation of a printed structure may include not only information about the geometry of the structure, but also information related to the materials required to print various portions of the structure.

In some embodiments, computing system 103 may be in direct contact with printing device 102 via network 101. Network 101 may include any wired or wireless provisions that facilitate the exchange of information between computing system 103 and printing device 102. In some embodiments, network 101 may further include various components such as network interface controllers, repeaters, hubs, bridges, switches, routers, modems and firewalls. In some cases, network 101 may be a wireless network that facilitates wireless communication between two or more systems, devices, and/or components of printing system 100. Examples of wireless networks include, but are not limited to: wireless personal area networks (including, for example, Bluetooth), wireless local area networks (including networks utilizing the IEEE 802.11 WLAN standards), wireless mesh networks, and mobile device networks, as well as other kinds of wireless networks. In other cases, network 101 could be a wired network including networks whose signals are facilitated by twisted pair wires, coaxial cables, and optical fibers. In still other cases, a combination of wired and wireless networks and/or connections could be used.

Printing system 100 may be operated as follows to form one or more structures using a 3D printing, or additive, process. Computing system 103 may be used to design a structure. This may be accomplished using some type of CAD software, or other kind of software. The design may then be transformed into information that can be interpreted by printing device 102 (or a related print server in communication with printing device 102). In some cases, the design may be converted to a 3D printable file, such as a stereolithography file (STL file).

Before printing, an article may be placed onto or around an article receiving device or may be secured to an article receiving device. Once the printing process is initiated (by a user, for example), print application device 105 may begin depositing material onto the article. This may be accomplished by moving printhead 120 (using print application device 105) to build up layers of a structure using deposited material. In embodiments where fused filament fabrication is used, material extruded from nozzle 117 may be heated by heater 180 so as to increase the pliability of the heat moldable material as it is deposited.

Although some of the embodiments shown in the figures depict a system using filament fused fabrication printing technologies, it will be understood that still other embodiments could incorporate one or more different 3D printing technologies. For example, printing system 100 may use a tack and drag print method. Moreover, still other embodiments could incorporate a combination of filament fused fabrication and another type of 3D printing technique to achieve desired results for a particular printed structure or part.

In different embodiments, printing device 102 may use a variety of different materials for forming 3D parts, including, but not limited to: thermoplastics (e.g., polyactic acid and acrylonitrile butadiene styrene), high density polyethylene, eutectic metals, rubber, clays (including metal clays), Room Temperature Vulcanizing silicone (RTV silicone), and porcelain, as well as possibly other kinds of materials known in the art. In embodiments where two or more different printed or extruded materials are used to form a part, any two or more of the materials disclosed above could be used.

As discussed above, in some embodiments, printed structures may be printed directly to one or more articles. The term "articles" is intended to include both articles of footwear (e.g., shoes) and articles of apparel (e.g., shirts and pants), as well as various other objects. As used throughout this disclosure, the terms "article of footwear" and "footwear" include any footwear and any materials associated with footwear, including an upper, and may also be applied to a variety of athletic footwear types, including baseball shoes, basketball shoes, cross training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of footwear, the disclosed embodiments may further be equally applied to any article of clothing, apparel, or equipment that includes 3D printing. For example, the disclosed embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc. As used throughout this disclosure, the terms "article of apparel," "apparel,"

"article of footwear," and "footwear" may also refer to a textile, a natural fabric, a synthetic fabric, a knit, a woven material, a nonwoven material, a mesh, a leather, a synthetic leather, a polymer, a rubber, and a foam.

In order to apply printed materials directly to one or more articles, printing device 102 may be capable of printing onto the surfaces of various kinds of materials. Specifically, in some cases, printing device 102 may be capable of printing onto the surfaces of various materials such as a textile, a natural fabric, a synthetic fabric, a knit, a woven material, a nonwoven material, a mesh, a leather, a synthetic leather, a polymer, a rubber, and a foam, or any combination thereof, without the need for a release layer interposed between a substrate and the bottom of the printed material, and without the need for a perfectly or near-perfectly flat substrate surface on which to print. For example, the disclosed methods may include printing a resin, acrylic, thermoplastic material, or ink material onto a fabric, for example, a knit material, where the material is adhered or bonded to the fabric and where the material does not generally delaminate when flexed, rolled, worked, or subjected to additional assembly processes or steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, foam, and combinations thereof.

Although some embodiments may use printing device 102 to print structures directly onto the surface of a material, other embodiments may include steps of printing a structure onto a tray, base, or release paper, and then joining the printed structure to an article in a separate step. In other words, in at least some embodiments, printed structures need not be printed directly to the surface of article receiving devices 130.

Referring now to FIG. 3, the relationship between print assembly 106 and article of footwear 113 is depicted in greater detail. Article of footwear 113 is mounted onto footwear receiving device 107. Further, footwear receiving device 107 is secured to arm 114 of article translating device 110. As shown, lower surface 115 of sole structure 116 of article of footwear 113 is oriented toward printing assembly 106. Printing assembly 106 may be secured to tool attachment portion 118 of print application device 105. Printing assembly 106 may be configured to deposit a print material onto lower surface 115 of article of footwear 113.

In some embodiments, the nozzle of a printhead is configured to extrude various materials. As shown, printhead 120 may be configured to extrude a substantially elongated continuous composite yarn 202, or printhead 120 may extrude multiple elongated continuous composite yarn segments. For example, in some embodiments, composite yarn 202 may include a melt resistant material and/or a heat moldable material. As used herein, heat moldable material includes thermoplastic. In some embodiments, a composite yarn is at least partially formed of thermoplastic. In some embodiments, composite yarn may also include carbon fiber.

It should be noted that in different embodiments, the print material may be ejected or otherwise emitted via nozzle 117 in the form of droplets. One of ordinary skill in the art will recognize that the form of the droplets may vary depending on the actual material ejected or otherwise emitted from nozzle 117. In some embodiments, the droplets may thus be any viscosity liquid material, or even a semi-solid material. Consistent with an embodiment, the droplets may be any desired material or phase of material suitable for use in printing system 100.

In different embodiments, a continuous segment of composite yarn 202 extends from spool 108 to nozzle 117. From nozzle 117 composite yarn 202 may extend over a portion of article of footwear 113. As shown in FIG. 3, composite yarn 202 extends over a portion of lower surface 115 of sole structure 116. In should recognized, however, that article of footwear 113 may be rotated or translated to allow for composite yarn 202 to be secured to other various portions of article of footwear 113 or other articles.

As shown in FIG. 3, printing assembly 106 is secured to tool attachment portion 118 of print application device 105. Print assembly 106 includes support structure 124, printhead 120, as well as spring 125. As shown in FIG. 3 and in other figures, support structure 124 includes a path or passageway 126 in a central region of support structure 124. Passageway 126 may allow for printhead 120 to translate or move vertically from an extended position to a retracted position when printhead 120 is subjected to sufficient force to compress spring 125.

In some embodiments, a spring may be used to regulate the motion of a printhead of a print assembly. As shown, spring 125 is a coil spring, however, other types of springs may be used in conjunction with print assembly 106. As printhead 120 encounters an obstruction in the path of printhead 120, printhead 120 may make contact with the obstruction. If the force with which printhead 120 contacts the obstruction is greater than the force required to compress spring 125, printhead 120 may translate along passageway 126 of support structure 124. The amount of force necessary to compress spring 125 may be changed by changing the spring constant of spring 125. Spring 125 may therefore be selected or designed to accommodate varying levels of force before compressing.

In some embodiments, nozzle 117 may include a bumper or obstruction detection portion. The bumper may be located adjacent to nozzle aperture 119. As nozzle 117 encounters an obstruction, the bumper may first contact the obstruction. When sufficient force to compress spring 125 is achieved, printhead 120 may translate through passageway 126 thereby moving nozzle 117 such that composite yarn 202 may be able to be deposited along or around the obstruction. By including a bumper, nozzle 117 itself may not be required to contact the obstruction. This may allow there to be a space between the obstruction and composite yarn 202 that exits through nozzle aperture 119. This space may reduce the likelihood that composite yarn 202 may be pressed, kinked or disfigured by the obstruction.

Figure 4:
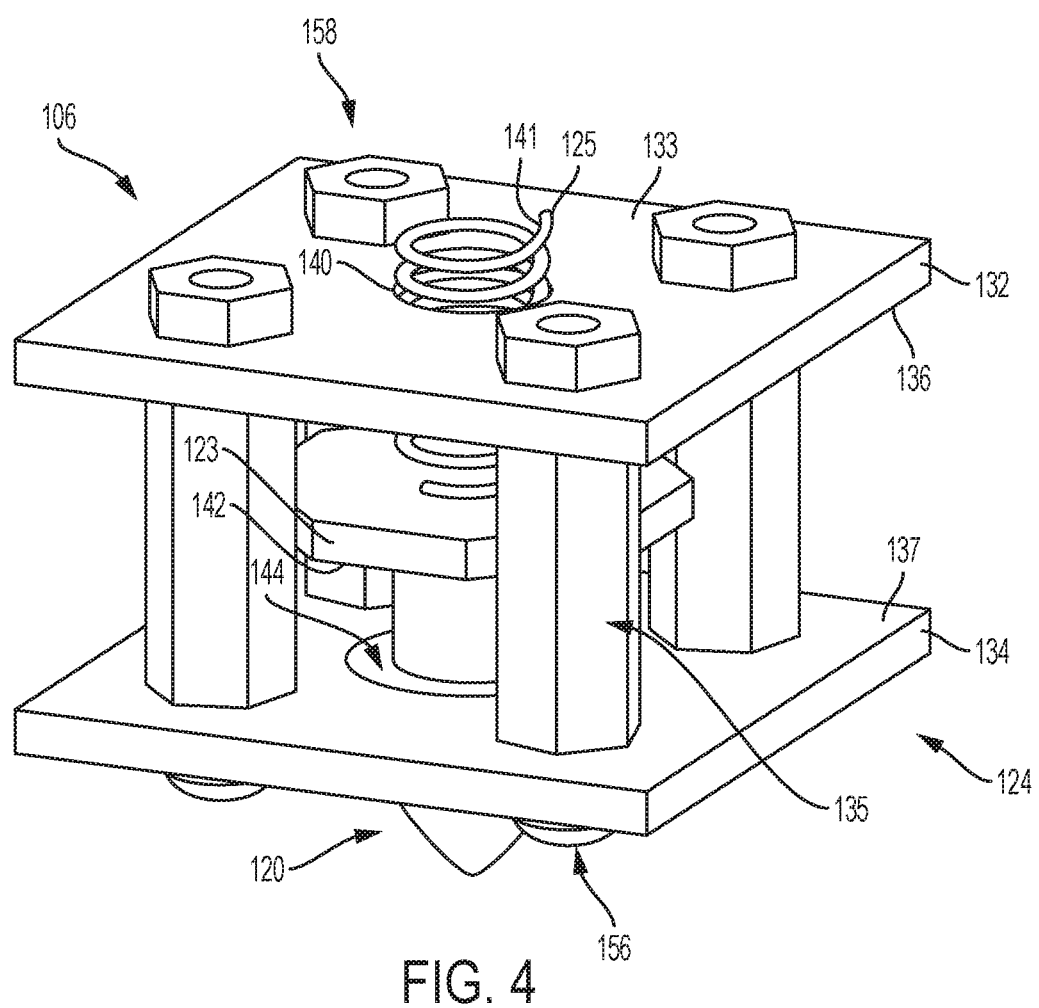
FIG. 4 is a schematic view of an embodiment of a printing assembly.
Figure 5:
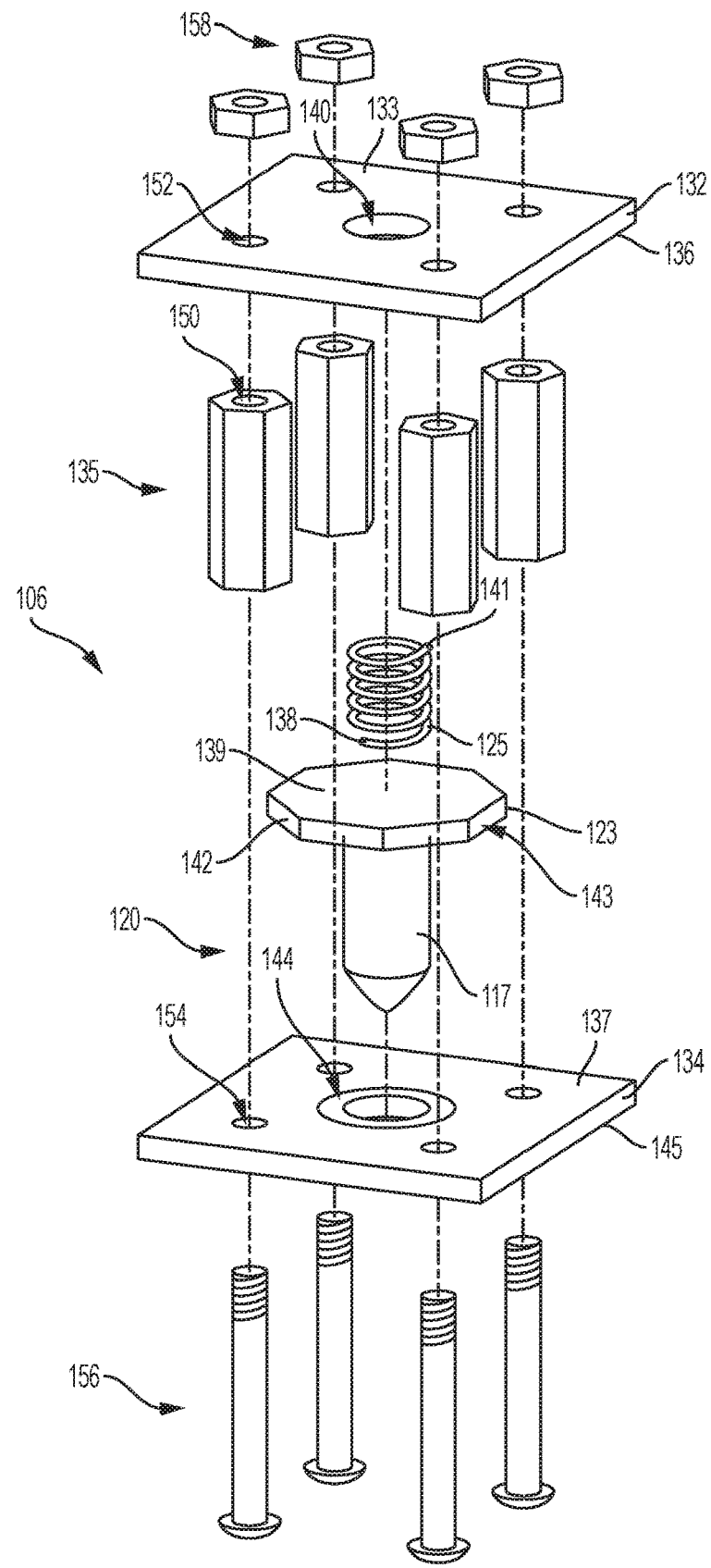
FIG. 5 is a schematic exploded view of an embodiment of a printing assembly.

Referring now to FIGS. 4 and 5, the components of print assembly 106 are discussed and described in further detail. Support structure 124 includes an upper portion 132 and a lower portion 134. In some embodiments, upper portion 132 may be secured to tool attachment portion 118 as depicted in previous figures. Upper surface 133 of upper portion 132 may be configured to be attachable and attached to tool attachment portion 118. Further, upper portion 132 may be spaced apart from lower portion 134 by set of spacing members 135. Set of spacing members 135 may be disposed between upper portion 132 and lower portion 134. In some embodiments, set of spacing members 135 may extend from lower surface 136 of upper portion 132 to upper surface 137 of lower portion 134.

In some embodiments, the printhead of a printing assembly may have various shapes. In some embodiments, the shape of the printhead may impact the particular manner in which the printhead functions within the printing assembly. As shown in FIGS. 4 and 5, printhead 120 includes nozzle 117 and retaining portion 123. In some embodiments, nozzle 117 may have a conical shape at the tip and a cylindrical shape along the body of nozzle 117. Retaining portion 123 may also have a cylindrical shape, however, the cross-section of retaining portion 123 may be larger than the cross-section of the cylindrical portion of nozzle 117. Additionally, in other embodiments, such as shown in FIG. 5, retaining portion 123 may have a different cross-sectional shape. Retaining portion 123 as shown in FIG. 5 has an octagonal cross-sectional shape. That is, retaining portion 123 includes upper surface 139, lower surface 142, and eight plurality of side surfaces 143 that extend between upper surface 139 and lower surface 142. In other embodiments, other shapes may be utilized such that the number of side surfaces is greater or less than eight.

In some embodiments, the lower portion of the support structure may include a through hole for accepting the printhead. As shown in FIGS. 4 and 5, guide hole 144 is located in lower portion 134. Guide hole 144 extends from upper surface 137 of lower portion 134 through lower surface 145 of lower portion 134. Additionally, in some embodiments, guide hole 144 may be sized such that printhead 120 may translate through and along guide hole 144. In some embodiments, guide hole 144 may have a larger cross section than nozzle 117 of printhead 120. By sizing guide hole 144 larger than nozzle 117 of printhead 120, nozzle 117 may be able to translate along guide hole 144. In some embodiments, however, guide hole 144 may be sized such that retaining portion 123 is restricted from passing through guide hole 144. That is, in some embodiments, the cross-section of guide hole 144 may be smaller than the cross-section of retaining portion 123. In some embodiments, lower surface 142 of retaining portion 123 may contact upper surface 137 of lower portion 134. In such cases, upper surface 137 may restrict the motion of printhead 120 by preventing retaining portion 123 from passing through guide hole 144. Additionally, when lower surface 142 of retaining portion 123 contacts upper surface 137 of lower portion 134, printhead 120 may be considered to be in a fully extended position. That is, upper surface 139 of retaining portion 123 may be the farthest distance away from lower surface 136 of upper portion 132. This position will be discussed in further detail below.

In some embodiments, the upper portion of the support structure may include an upper through hole. In some embodiments, the upper through hole may be configured to allow the spring to pass through the upper portion. In other embodiments, the upper through hole may be configured to allow the composite yarn to pass through the upper portion. As shown in FIGS. 4 and 5, upper through hole 140 may be configured to allow a portion of spring 125 to pass through upper portion 132. In such embodiments, upper end 141 of spring 125 may contact tool attachment portion 118. Additionally, composite yarn 202 may also pass through upper through hole 140. In other embodiments, upper portion 132 may not include an upper through hole, or the through hole may not be large enough such that spring 125 extends through the through hole. In such embodiments, upper end 141 of spring 125 may contact lower surface 136 of upper portion 132.

In some embodiments, spring 125 may be configured to contact an upper surface of the retaining portion of the printhead. As shown particularly in FIG. 5, lower end 138 of spring 125 contacts upper surface 139 of retaining portion 123. When assembled, spring 125 may be biased against printhead 120, forcing printhead 120 into an extended position. That is, in some embodiments, spring 125 may press against upper surface 139 of retaining portion 123 and force lower surface 142 of retaining portion 123 to press against upper surface 137 of lower portion 134. In embodiments that utilize spring 125, lower end 138 of spring may press against upper surface 139 of retaining portion 123 and upper end 141 of spring 125 may press against lower surface 136 of upper portion 132 or against tool attachment portion 118 in embodiments that allow spring 125 to pass through upper through hole 140. Spring 125 may be positioned between the two surfaces or portions and biased such that a spring force urges printhead 120 toward an extended position. In other embodiments, a spring may not be utilized. In such embodiments, the weight of printhead 120 may be sufficient such that retaining portion 123 may rest upon lower portion 134 without any additional force being provided to upper surface 139 of retaining portion 123 by a spring or other techniques.

In some embodiments, the length of each member of the set of spacing members may determine a stroke length or distance that printhead 120 may travel or translate. For example, in some embodiments, the length of each member of set of spacing members 135 may be relatively short. In such embodiments, the distance between lower surface 136 of upper portion 132 and upper surface 137 of lower portion 134 may also be a relatively short distance. In other embodiments, the length of each member of set of spacing members 135 may be a relatively longer distance. In such embodiments, the distance between lower surface 136 of upper portion 132 and upper surface 137 of lower portion 134 may also be a relatively long distance. By altering or adjusting the length of each member of set of spacing members 135, the length of passageway 126 may also be altered. Because the length of passageway 126 may be altered, the distance or stroke length that printhead 120 may travel may also be altered. That is, the distance between printhead 120 in a retracted position compared to an extended position may be altered. For example, in a first embodiment with shorter spacing members, nozzle 117 may experience a vertical force that forces printhead 120 to translate and move toward upper portion 132. Because the distance between upper portion 132 and lower portion 134 is short, however, printhead 120 may only move a first distance before printhead 120 is restricted from moving any further. In a second embodiment with longer spacing members, printhead 120 may be able to travel a second distance before printhead 120 is restricted from moving any further. In this embodiment, the second distance may be greater than the first distance. The distance may be altered in order to achieve different values with regard to the spring that is utilized or the distance may be altered depending on the article to be printed upon. For example, longer spacing members may be utilized when printing on an article with larger variations along the target surface.

In some embodiments, set of spacing members 135 may be separate pieces from upper portion 132 and lower portion 134. In other embodiments, set of spacing members 135 may be co-molded or co-formed with either or both of upper portion 132 and lower portion 134. As shown in FIGS. 4 and 5, set of spacing members 135 are separate members from lower portion 134 and upper portion 132. In the embodiment as depicted, set of spacing members 135 may be secured to either or both of lower portion 134 and upper portion 132 by a fastener or any other techniques. In some embodiments, set of spacing members 135 may include set of through holes 150 such that a through hole is formed in each spacing member. Each through hole of set of through holes 150 may extend from a first end of a spacing member to a second end of the spacing member. Each through hole of set of through holes 150 may therefore extend from and between upper surface 137 of lower portion 134 to lower surface 136 of upper portion 132 when printing assembly 106 is assembled. In some embodiments, upper portion 132 may include set of through holes 152. Set of through holes 152 may be positioned in upper portion 132 such that when assembled, set of through holes 150 of set of spacing members 135 aligns with set of through holes 152 of upper portion 132. Additionally, in some embodiments, lower portion 134 may include set of through holes 154. Set of through holes 154 may be positioned in lower portion 134 such that when assembled, set of through holes 150 of set of spacing members 135 aligns with set of through holes 154 of lower portion 134. In some embodiments, each hole of the sets of through holes may be aligned such that when assembled, set of through holes 152 of upper portion 132 align with set of through holes 150 of set of spacing members 135 and set of through holes 150 align with set of through holes 154 of lower portion 134. That is, when aligned a through hole may extend from upper portion 132 through set of spacing members 135 and through lower portion 134.

In some embodiments, printing assembly 106 may include fasteners or other mechanisms that may join or secure multiple portions of support structure 124 together. In some embodiments, screws, bolts, nails or other mechanisms may be utilized. In other embodiments, glue or other adhesives may be utilized to secure portions of support structure 124. As shown in FIGS. 4 and 5, plurality of fasteners 156 may be used to secure various portions of support structure 124 together. As shown, plurality of fasteners 156 may be bolts; however, in other embodiments, other types of fasteners may be utilized. Each fastener of plurality of fasteners 156 may pass through set of through holes 154 of lower portion 134, set of through holes 150 of set of spacing members 135 and through set of through holes 152 of upper portion 132.

In some embodiments, the through holes of set of through holes 150, set of through holes 152, and set of through holes 154 may be threaded such that plurality of fasteners 156 may be tightened into the through holes. In other embodiments, the through holes may not be threaded or may not otherwise provide a mechanism to allow plurality of fasteners 156 to secure each of the members together. As shown in FIGS. 4 and 5, plurality of nuts 158 may be utilized in conjunction with plurality of fasteners 156 to secure various portions together. In some embodiments, plurality of nuts 158 may be threaded. Further, plurality of fasteners 156 may also be threaded. Plurality of nuts 158 may be tightened on plurality of fasteners 156 in order to secure lower portion 134, upper portion 132, and set of spacing members 135 together.

Figure 6:
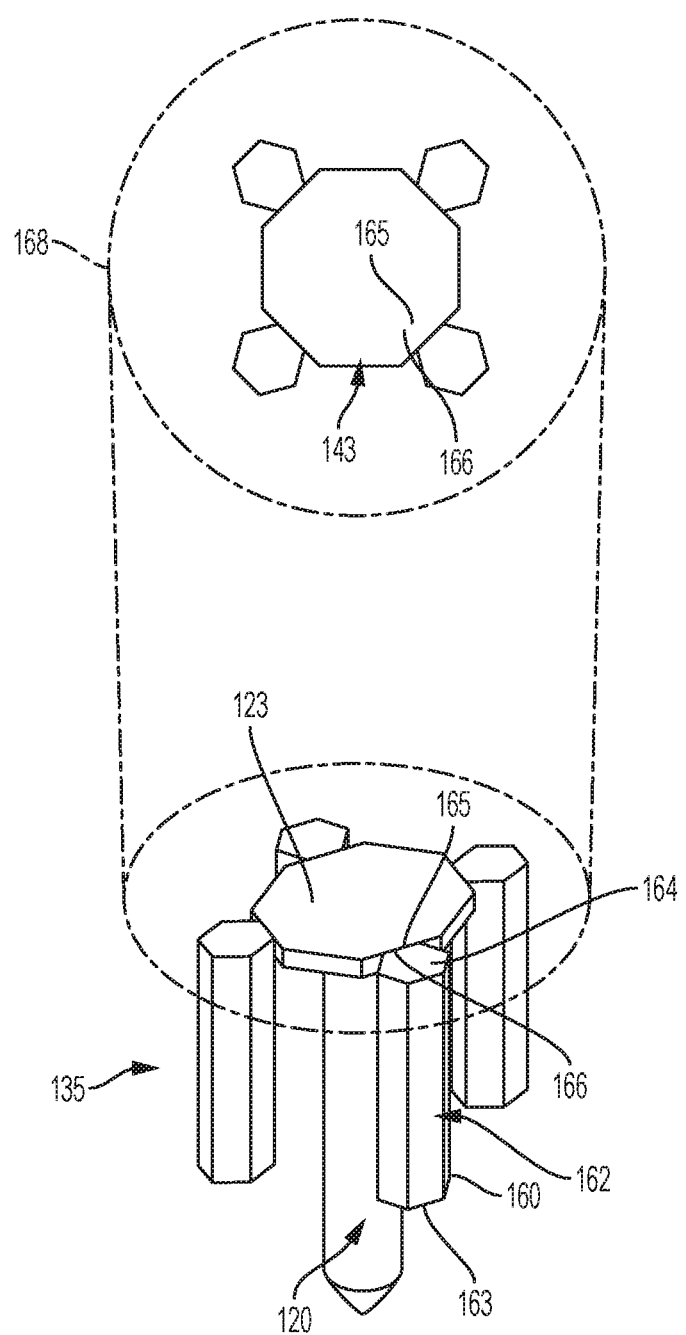
FIG. 6 is a schematic view of an embodiment of a printhead and a plurality of spacing members.

Referring now to FIG. 6, set of spacing members 135 are depicted in isolation with printhead 120. In some embodiments, each spacing members 135 and retaining portion 123 may work in conjunction with each other to limit or resist retaining portion 123 from twisting or spinning as printhead 120 translates within and along passageway 126. In some embodiments, each member of set of spacing members 135 may include a plurality of side surfaces. For example, spacing member 160 includes plurality of side surfaces 162 that extend from lower end 163 to upper end 164. In some embodiments, plurality of side surfaces 162 may be substantially planar. In other embodiments, plurality of side surfaces 162 may have other configurations such as non-planar configurations.

In some embodiments, the side surfaces of the spacing members may be configured to engage with the side surfaces of the retaining portion of the printhead. Additionally, top view 168 also depicts the engagement of plurality of side surfaces 143 with the various side surfaces of set of spacing members 135. As shown in FIG. 6, plurality of side surfaces 143 of retaining portion 123 may be configured to interact with the side surfaces of each member of set of spacing members 135. In a similar configuration plurality of side surfaces 162 and plurality of side surfaces 143 of retaining portion 123 may be planar. Referring particularly to side surface 165 of retaining portion 123, side surface 165 of retaining portion 123 may engage with side surface 166 of spacing member 160. As shown, side surface 165 of retaining portion 123 and side surface 166 of spacing member 160 may substantially align with one another. In some embodiments, side surface 165 of retaining portion 123 and side surface 166 of spacing member 160 may be in contact with each other. Due to the geometry and shape of side surface 165 and side surface 166, printhead 120 may be restricted from rotating about a vertical axis. Side surface 166, along with other side surfaces of set of spacing members 135 may engage with plurality of side surfaces 143 of retaining portion 123. As shown, each member of set of spacing members 135 includes six side surfaces, and retaining portion 123 includes eight side surfaces. Other configurations of surfaces may be utilized to restrict the rotational movement of printhead 120. By restricting the rotational movement of printhead 120, accuracy and consistency of depositing print material may be increased as compare to other embodiments that do not restrict the rotation of printhead 120.

Figure 7:
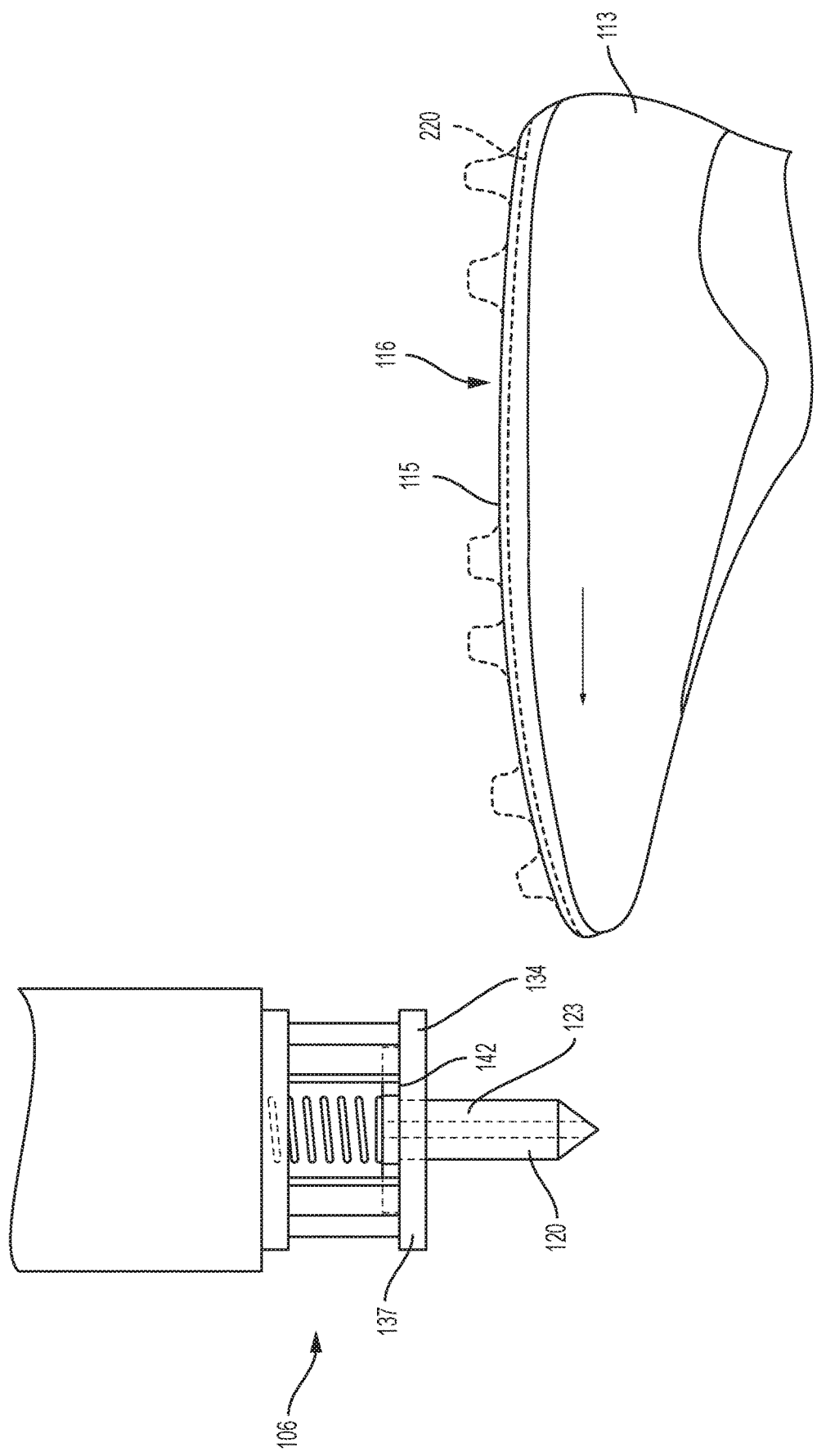
FIG. 7 is a schematic view of an embodiment of a printing assembly during use.
Figure 8:
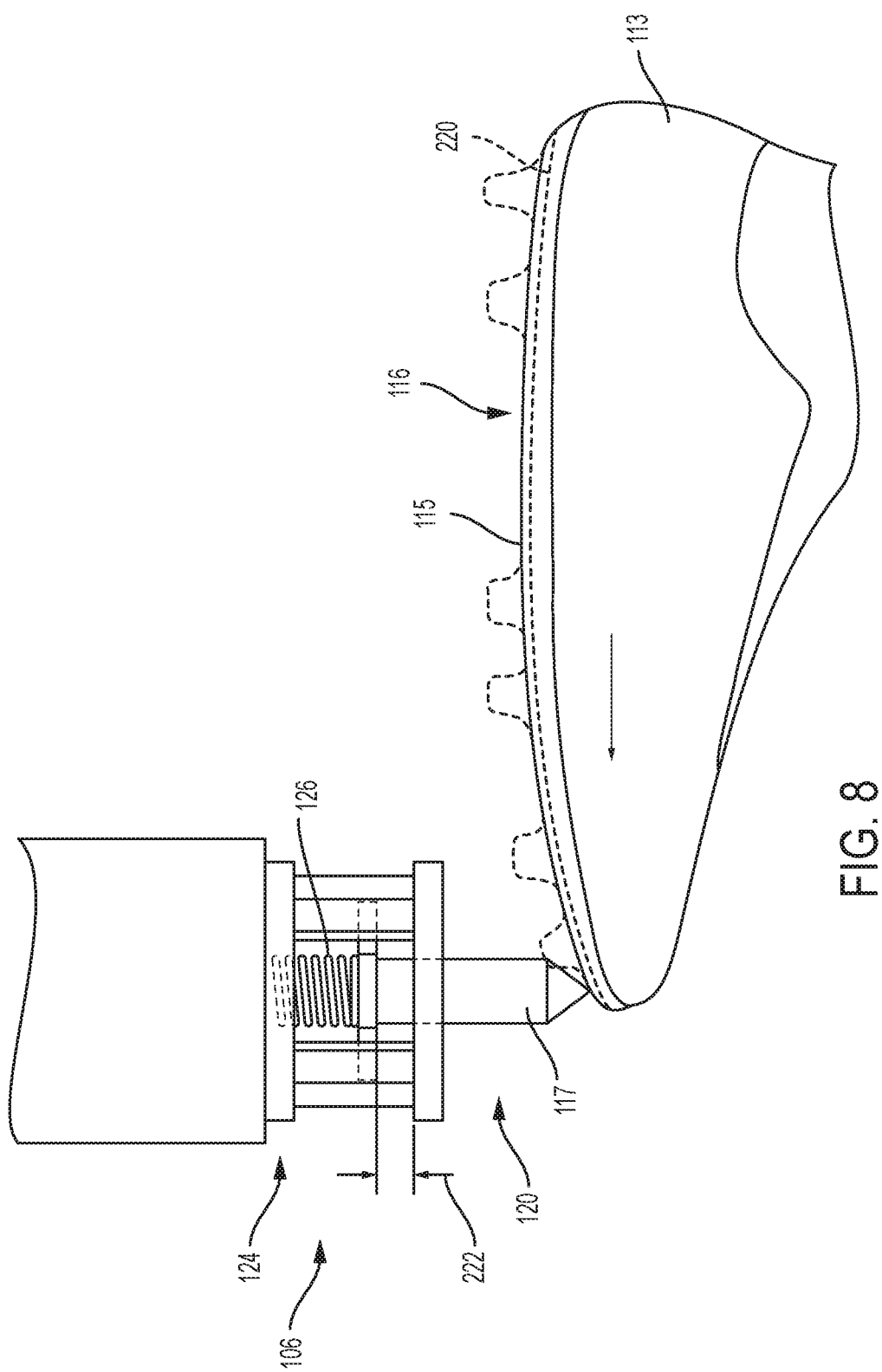
FIG. 8 is a schematic view of an embodiment of a printing assembly during use.
Figure 9:
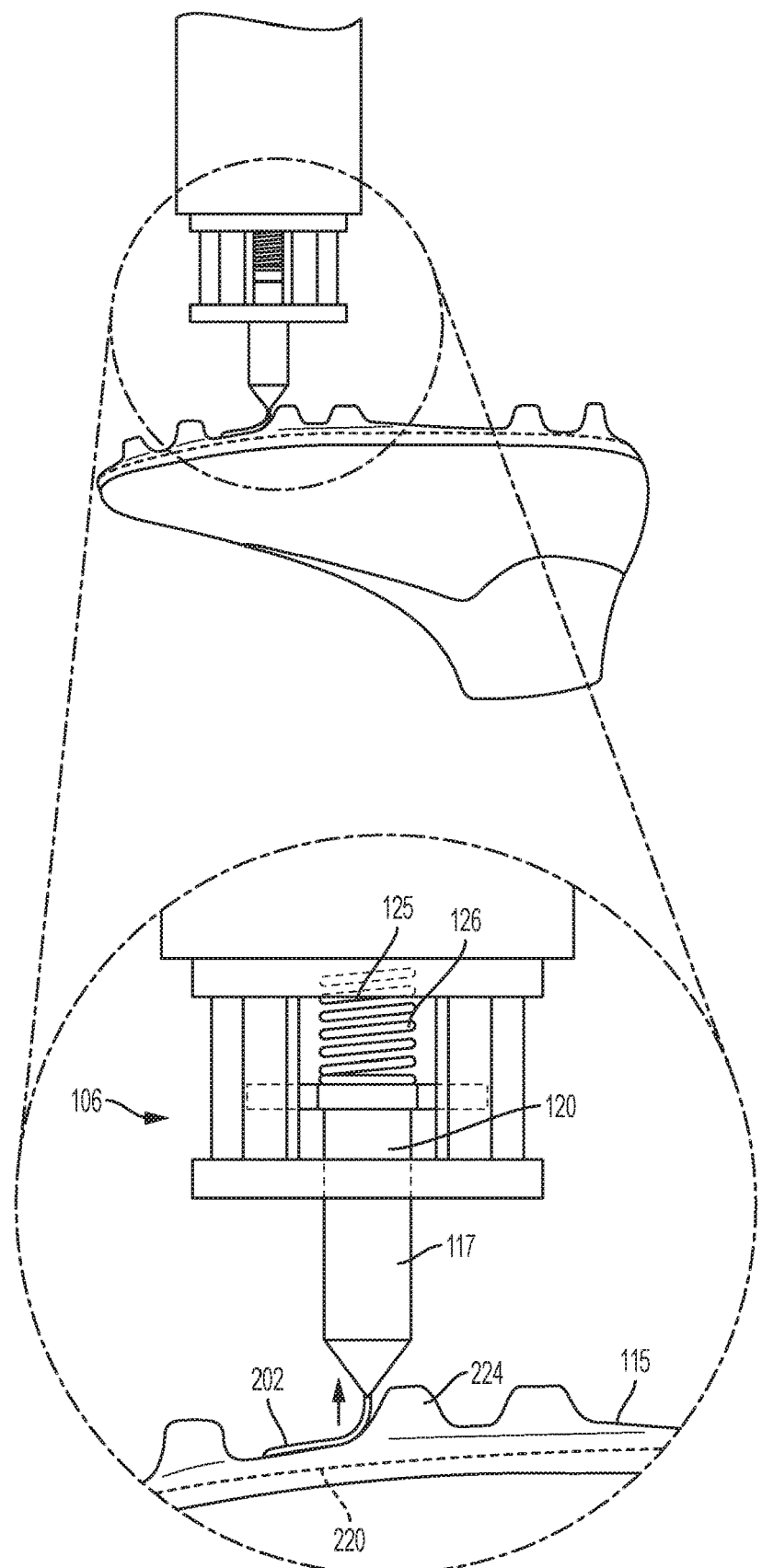
FIG. 9 is a schematic enlarged view of an embodiment of a printing assembly encountering an obstruction.
Figure 10:
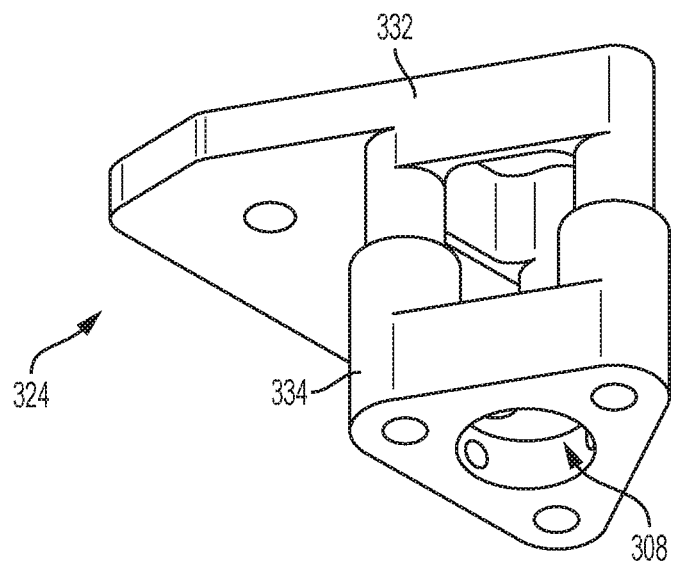
FIG. 10 is a schematic view of an alternate embodiment of a support structure of a printing assembly.
Figure 11:
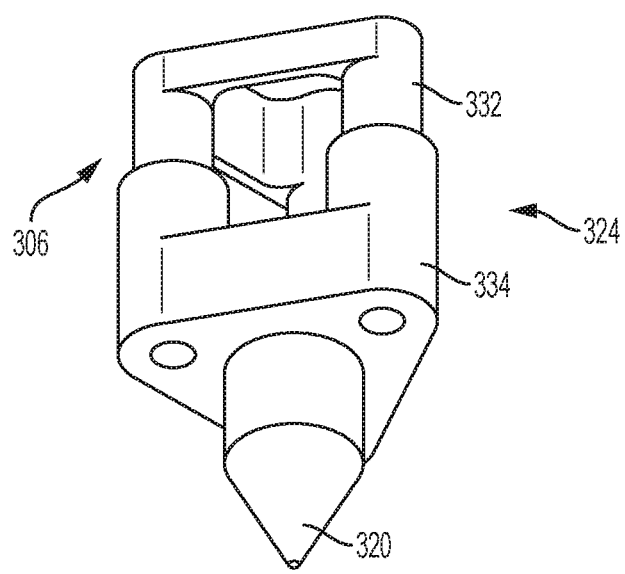
FIG. 11 is a schematic view of an alternate embodiment of a printing assembly.
Figure 12:
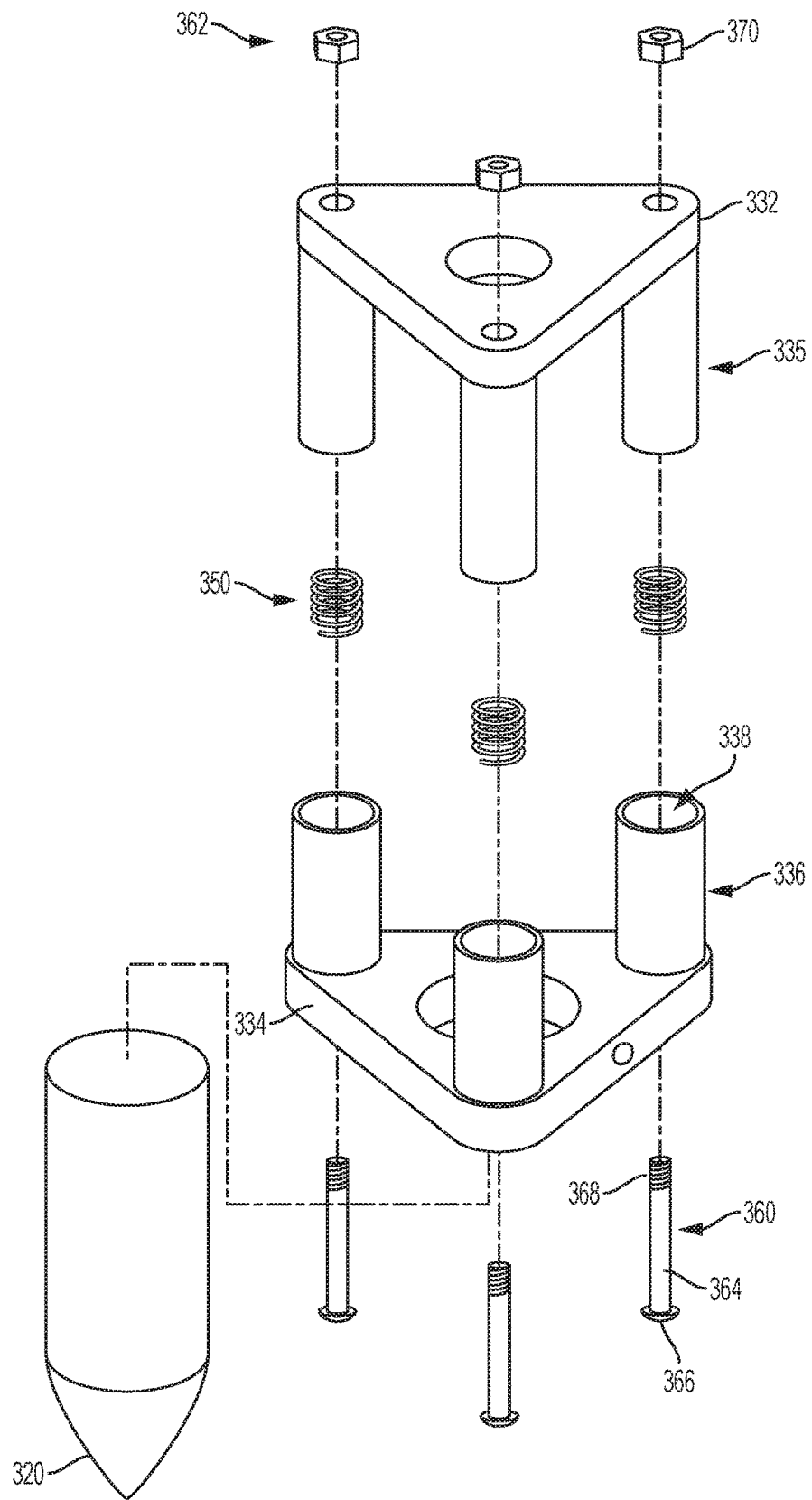
FIG. 12 is a schematic exploded view of an alternate embodiment of a printing assembly.
Figure 13:
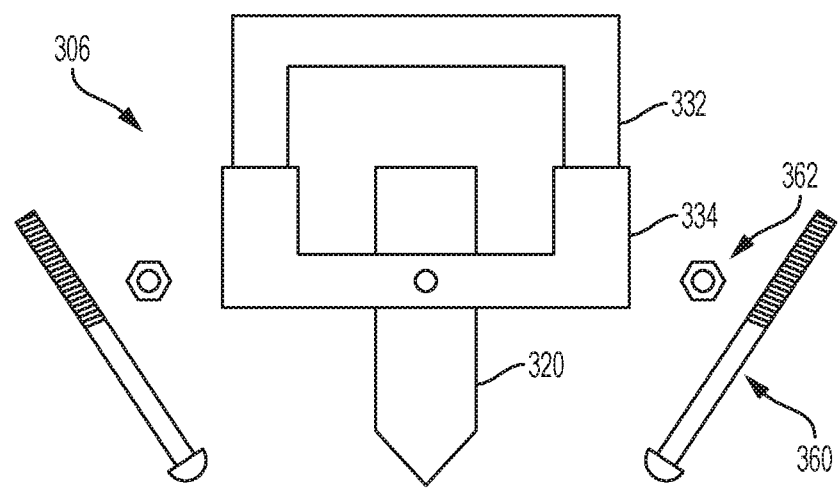
FIG. 13 is a schematic view of a printing assembly with plurality of fasteners removed.

Referring now to FIGS. 7-9, printing assembly 106 that is attached to tool attachment portion 118 is shown in use. Referring to FIG. 7, article of footwear 113 is depicted translating towards printing assembly 106. As discussed previously, in other embodiments printing assembly 106 or article of footwear 113 may be moved by print application device 105 or article translating device 110. In this depiction, and for ease of description, article translating device 110 may translate while print application device 105 remains stationary. As shown, printing assembly 106 in the current location has not encountered an upward force upon printhead 120. Therefore, printhead may be in a resting position, or fully extended position. In this configuration lower surface 142 of retaining portion 123 may rest upon upper surface 137 of lower portion 134.

In some embodiments, a printhead path may be programmed into printing system 100. The printhead path may be a predetermined path that corresponds to a path onto which print material is deposited. That is, the printhead path may be a target location for depositing print material. As shown in FIG. 7, printhead path 220 is located toward the upper of article of footwear 113 from lower surface 115. In some embodiments, portions of printhead path 220 may be located along lower surface 115. In still further embodiments, printhead path 220 may be fully along lower surface 115. As shown, printhead path 220 may be a generally smooth path that does not completely or exactly follow or correspond to various features of lower surface 115 of sole structure 116. In other embodiments, printhead path 220 may correspond to the various features of lower surface 115.

Referring now to FIG. 8, article of footwear 113 has translated toward printing assembly 106. As article of footwear 113 contacts printhead 120, lower surface 115 of article of footwear 113 may cause printhead 120 to recess into passageway 126 of support structure 124. In some embodiments, distance 222 that printhead 120 recesses may be equal to the distance between printhead path 220 and lower surface 115.

In some embodiments, lower surface 115 may prevent printhead 120 from being able to deposit composite yarn 202 along printhead path 220. In such embodiments, composite yarn 202 may be deposited along lower surface 115 that is between printhead path 220 and printhead 120. As printhead 120 encounters an obstruction on lower surface 115, the force from lower surface 115 may be sufficient to compress spring 125 and force printhead 120 along passageway 126.

In some embodiments, printhead path 220 may include variations, undulations or other features. In such embodiments, article translating device 110 and/or print application device 105 may move to position printhead 120 to be able to deposit print material along the varying path. As described above, printing assembly 106 may still translate when printhead encounters an obstruction on lower surface 115. That is, although printhead 120 may translate vertically when printhead 120 encounters an obstruction, article translating device 110 and/or print application device 105 may still translate printing assembly 106 vertically to diminish or lessen the amount that the spring in printing assembly 106 compresses when printhead 120 is required to translate vertically along passageway 126.

In some embodiments, printhead path 220 may have a smooth or more gradual layout than lower surface 115. Because printhead path 220 may be smooth or gradual, it may be easier to program printhead path 220 than paths that include multiple undulations or non-linear changes. Because printhead 120 may be configured to translate along passageway 126 when printhead 120 encounters obstructions, each obstruction may not be needed to be programmed into the path of printhead 120. Spring 125 may compress as nozzle 117 encounters obstructions allowing a print material to be deposited and therefore each obstruction does not need to be programmed into the path of printhead 120.

In some embodiments, programming a simple path may reduce the time required to deposit print material along a target location. In some embodiments, the number of movements required by article translating device 110 and/or print application device 105 to deposit a print material along a target surface may be reduced by utilizing printing assembly 106. In some embodiments, a number of vertical movements to accommodate obstructions on lower surface 115 may be omitted because printing assembly 106 may be able to accommodate the variations in lower surface 115. Further, in comparison to other embodiments, printing assembly 106 may not be required to move laterally or longitudinally around obstructions, rather, printing assembly 106 may be able to translate over the obstructions and deposit print material along the obstructions. Because printhead 120 may be able to translate into passageway 126 and continue to print over obstructions, the obstructions do not necessarily need to be programmed into a printhead path. By reducing the number of required movements of printing assembly 106, printing assembly 106 may be able to deposit print material at a faster pace than in other embodiments that do not include printing assembly 106 with spring 125 that allow printhead 120 to translate.

Referring now to FIG. 9, printing assembly 106 is shown in an enlarged view encountering an obstruction. As shown, printhead 120 encounters obstruction 224 and translates vertically upward along passageway 126. In some embodiments, nozzle 117 of printhead 120 may physically contact obstruction 224 with sufficient force to cause spring 125 to compress and allow printhead 120 to translate along passageway 126. In other embodiments, as composite yarn 202 is deposited onto lower surface 115, composite yarn 202 may push against nozzle 117 with sufficient force to cause spring 125 to compress and allow printhead 120 to translate along passageway 126 toward a retracted position. That is, in some embodiments, nozzle 117 may not contact obstruction 224; however printhead 120 may still translate along passageway 126.

In some embodiments, printhead 120 may be able to translate between a fully extended position to a fully retracted position. A fully extended position is the position that printhead 120 may be in when no vertical force is applied to the printhead, or the vertical force applied to printhead 120 is not sufficient to cause spring 125 to compress. The fully retracted position is the position that printhead 120 may be in when spring 125 is fully compressed. In some embodiments, during use printhead 120 may be located at a point between the fully extended position and the fully retracted position. That is, in some embodiments, during use, a force may cause spring 125 to compress, however, in some embodiments, the force may not be sufficient cause spring 125 to completely compress. In some embodiments, printhead 120 may translate one millimeter during use. In other embodiments, printhead 120 may translate 10 millimeters during use. In other embodiments, printhead 120 may translate greater than 10 millimeters during use. The range of translation may be altered due to the orientation of the print target surface to printhead 120 as well as the spacing between upper portion 132 and lower portion 134 of support structure 124.

Referring now to FIGS. 10-20, an alternate embodiment of a printing assembly is depicted. Printing assembly 306 includes support structure 324 and printhead 320. As shown, support structure 324 includes upper portion 332 and a lower portion, referred to as carriage 334. Upper portion 332 and carriage 334 may interact with each other to allow printhead 320 to translate along a vertical axis.

In some embodiments, printhead 320 may be secured to carriage 334. In some embodiments, printhead 320 may be positioned within a lower through hole 308 positioned through the base of carriage 334. Once positioned within through hole 308, printhead 320 may be secured to carriage 334. In some embodiments, printhead 320 may be secured with a fastener, such as a set screw or other device. In other embodiments, printhead 320 may be secured using an adhesive. In still other embodiments, printhead 320 may be secured by other techniques.

In some embodiments, carriage 334 may be able to move with respect to upper portion 332 of support structure 324. As printhead 320 is contacted by a sufficient force, printhead 320, along with carriage 334, may translate with respect to upper portion 332. This is in contrast to printing assembly 106, as printhead 120 of printing assembly 106 translates when subjected to sufficient for to compress the spring, however lower portion 134 may remain stationary.

In some embodiments, the upper portion of a support structure may include a set of rods. As shown best in FIG. 12, upper portion 332 includes upper set of rods 335. Further, in some embodiments, carriage 334 includes lower set of sleeves 336. In some embodiments, upper set of rods 335 may be co-formed or co-molded with upper portion 332. That is, in some embodiments, upper portion 332 and upper set of rods 335 may be a single piece. Likewise, in some embodiments, carriage 334 and lower set of sleeves 336 may also be a single piece. In other embodiments, upper set of rods 335 and/or lower set of sleeves 336 may be separate pieces from upper portion 332 and carriage 334.

In some embodiments, the rods and sleeves may be particularly placed to interact with one another. In some embodiments, upper set of rods 335 may be located or placed along upper portion 332 such that upper set of rods 335 align with lower set of sleeves 336. That is, in some embodiments, each member of upper set of rods 335 may be spaced or arranged to interact or align with a corresponding member of lower set of sleeves 336.

Figure 14:
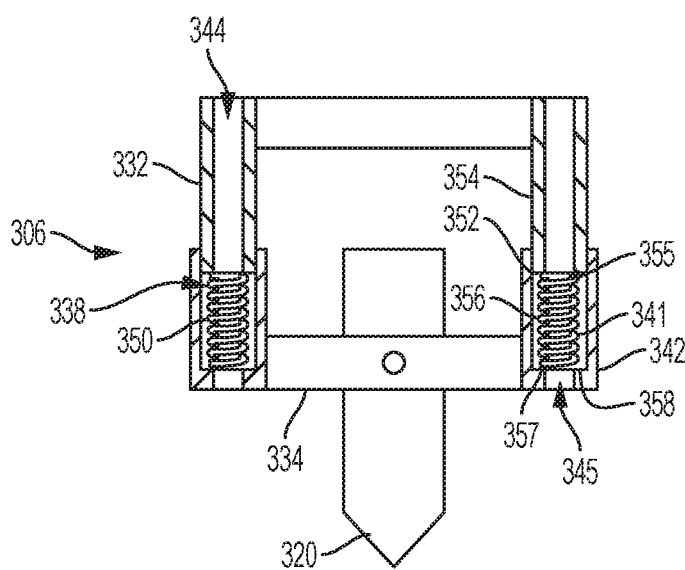
FIG. 14 is a cross-sectional view of the printing assembly of FIG. 13

In some embodiments, the rods and sleeves may be sized to interact with each other. In some embodiments, the rods and sleeves may include receiving holes. Referring to FIGS. 13-18, lower set of sleeves 336 includes set of receiving holes 338. Each through hole of set of receiving holes 338 may be sized to accommodate each rod of upper set of rods 335. That is, the cross section of each through hole of set of receiving holes 338 may be larger than the cross section of each rod of upper set of rods 335. As shown in FIG. 14, for example, upper rod 354 is partially disposed within receiving hole 341 of lower sleeve 342. The relationship between other members of upper set of rods 335 to other members of lower set of sleeves 336 may be similar to that of upper rod 354 and lower sleeve 342. That is, each rod of upper set of rods 335 may be able to fit within a receiving hole in each sleeve of lower set of sleeves 336. In other embodiments, the relationship may be reversed. For example, in some embodiments, sleeves of lower set of sleeves 336 may be able to fit within through holes in upper set of rods 335. In still further embodiments, some rods of upper set of rods 335 may be able to fit within receiving holes of lower set of sleeves 336 while some sleeves of lower set of sleeves 336 may be able to fit within receiving holes of upper set of rods 335.

In some embodiments, portions of a printing assembly may be able to move or translate with respect to each other. As shown in FIGS. 10-18, carriage 334 may be able to translate with respect to upper portion 332. As previously discussed, in some embodiments, upper portion 332 may be secured to a print application device that may be substantially stable with respect to support structure 324. As carriage 334 is subjected to a vertical force, carriage 334 may translate with respect to upper portion 332. For example, carriage 334 may move such that a greater percentage of upper set of rods 335 is located within set of receiving holes 338 than when carriage 334 is not subjected to a vertical force.

In some embodiments, portions of the support structure for the printing assembly may include through holes to accommodate fasteners. Referring to FIG. 14, through holes are depicted in both upper portion 332 and carriage 334. In the embodiment depicted in FIG. 14, upper portion 332 includes plurality of fastener through holes 344. In the embodiment shown, plurality of fastener through holes 344 extend through upper set of rods 335 and through upper portion 332. Further, as shown in FIG. 14, carriage 334 also includes fastener through holes. Carriage 334 may include plurality of fastener through holes 345. In some embodiments, plurality of fastener through holes 345 may be adjacent to set of receiving holes 341. That is, in some embodiments, plurality of fastener through holes 345 may be in fluid communication with set of receiving holes 341.

In some embodiments, the cross sections of the various holes may be different from each other. For example, the cross section of plurality of fastener through holes 344 may be smaller than the cross section of each hole of set of receiving holes 338. Additionally, in some embodiments, the cross section of various through holes may be similar. As shown in FIG. 14, the cross section of plurality of fastener through holes 344 may be similar to plurality of fastener through holes 345 of carriage 334.

In some embodiments, printing assembly 306 may further include a plurality of springs. As shown in FIGS. 12-18, printing assembly 306 includes plurality of springs 350. In some embodiments, each spring of plurality of springs 350 may be placed within each hole of set of receiving holes 338. In some embodiments, the sizing of plurality of fastener through holes 345 may restrict the movement of plurality of springs 350. That is, in some embodiments, each spring of plurality of springs 350 may be too large to pass through plurality of fastener through holes 345. Further, in some embodiments, upper set of rods 335 may also interact with plurality of springs 350. In some embodiments, upper set of rods 335 may be sized such that each rod interacts with an upper end of each spring of plurality of springs 350. For example, lower end 352 of upper rod 354 may contact upper end 355 of spring 356. Additionally, lower end 357 of spring 356 may contact fastener through hole surface 358. Therefore, lower end 352 of upper rod 354 in conjunction with fastener through hole surface 358 may restrict the motion of spring 356.

In some embodiments, a plurality of springs may be utilized to provide a resistance force to counter act a vertical force against carriage 334. In some embodiments, as carriage 334 is subjected to a vertical force towards upper portion 332, plurality of springs 350 may compress. In some embodiments, plurality of springs 350 may provide a resistance force to counteract vertical forces. That is, plurality of springs 350 may limit the motion of carriage 334 with respect to upper portion 332. By providing plurality of springs 350, in some embodiments, in order to move carriage 334 the vertical force may be required to be sufficient to compress plurality of springs 350. In comparison to embodiments without springs, a greater magnitude of force may be necessary to move carriage 334 when printing assembly 306 includes plurality of springs 350.

Additionally, in some embodiments, printing assembly 306 may include provisions to bias portions of printing assembly 306 toward a particular direction or orientation. In some embodiments, plurality of springs 350 may be utilized to bias carriage 334 away from upper portion 332. Therefore, a vertical force is removed from carriage 334; plurality of springs 350 may extend and force carriage 334 away from upper portion 332.

In some embodiments, printing assembly 306 may further include fasteners to connect the upper portion and lower portion of printing assembly 306 together. Referring to FIGS. 12-18, plurality of fasteners 360 may be positioned through plurality of fastener through holes 345 of carriage 334, through set of receiving holes 338 and then through plurality of fastener through holes 344 of upper portion 322. Further, plurality of fasteners 360 may be secured in place with a securement device. As shown in FIGS. 12-18, plurality of fasteners 360 may be secured by plurality of nuts 362.

Figure 15:
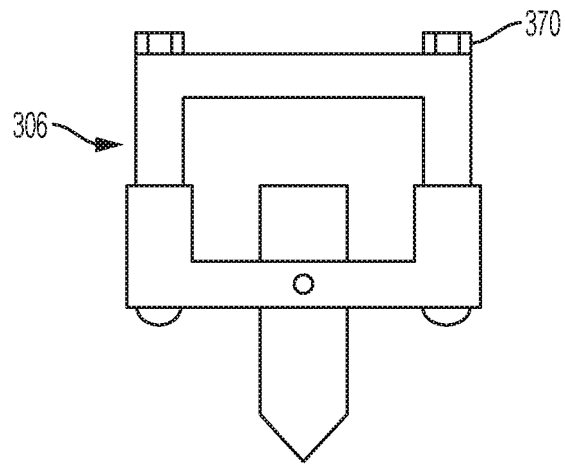
FIG. 15 is a schematic view of a an embodiment of a printing assembly in a relaxed state.
Figure 16:
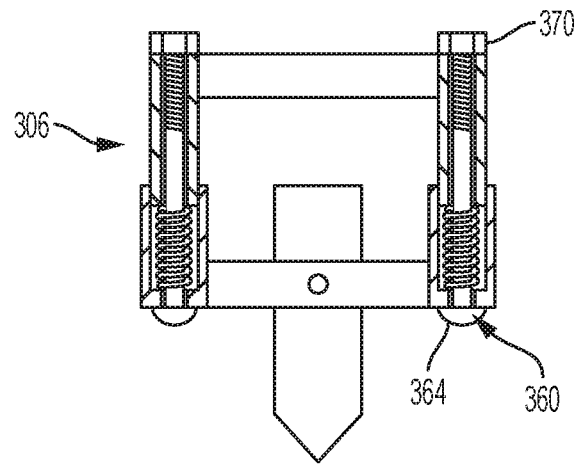
FIG. 16 is a cross-section view of the printing assembly of FIG. 15.

In some embodiments, plurality of fasteners 360 may include provisions to permit adjustment of fit or securement. Referring particularly to fastener 364, fastener 364 may include head 366 and threaded portion 368. Fastener 364 may be disposed through carriage 334 and upper portion 332 such that head 366 is disposed along a lower surface of carriage 334. Additionally, at least a portion of threaded portion 368 may extend above an upper surface of upper portion 332. Further, nut 370 may be positioned around threaded portion 368. In this configuration, as best shown in FIGS. 15 and 16, head 366 is against the lower surface of carriage 334 and nut 370 is against the upper surface of upper portion 332. In this configuration, carriage 334 and upper portion 332 may be secured to each other.

Figure 17:
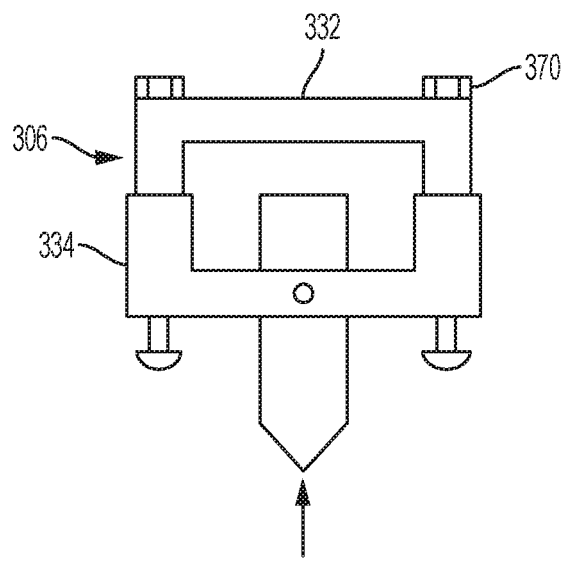
FIG. 17 is a schematic view of an embodiment of a printing assembly subjected to a vertical force.
Figure 18:
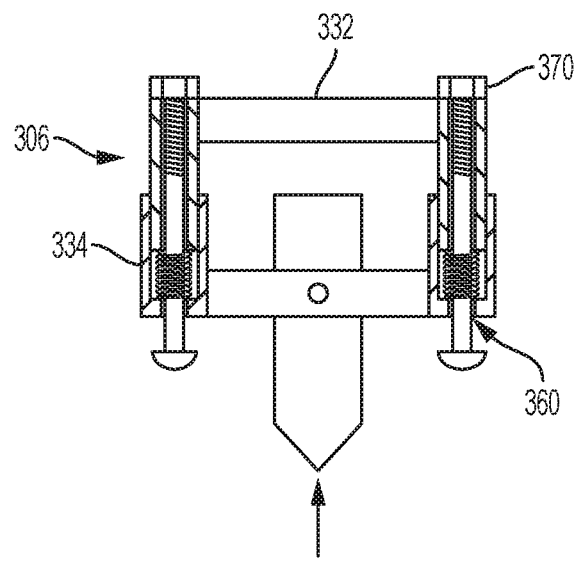
FIG. 18 is a cross-section view of the printing assembly of FIG. 17

In some embodiments, the upper portion and lower portion of a printing assembly may be movably secured to each other. As shown in FIGS. 15-18, carriage 334 may be secured to upper portion 332, however, carriage 334 may still be able to move relative to upper portion 332. As shown in FIGS. 17 and 18, when subjected to vertical force 400, carriage 334 may translate or move towards upper portion 332. The distance that carriage 334 may be able to translate may be determined by the degree to which plurality of nuts 362 are tightened on plurality of fasteners 360. In examples in which plurality of nuts 362 are tightened to a greater degree, the distance that carriage 334 may be able to translate may be limited. That is because by tightening plurality of nuts 362, the distance between lower end 352 of upper rod 354, for example, and fastener through hole surface 358 may be limited or diminished. Because lower end 352 would contact fastener through hole surface 358, the distance between lower end 352 and fastener through hole surface 358 may determine the maximum distance that carriage 334 may translate when subjected to a vertical force.

In some embodiments, rods and sleeves may be particularly placed or located on an upper portion or lower portion. In some embodiments, the orientation of the spacing members may assist in providing a stable platform for a printhead. As shown in FIGS. 10-18, upper set of rods 335 and lower set of sleeves 336 may be located in a triangular orientation. When assembled, the orientation of the rods and sleeves may assist in providing a stable platform for printhead 320. Due to the triangular orientation, printing assembly 306 may resist twisting and tilting to allow for printhead 320 to print along a consistent path. In other embodiments, other orientations and configurations may be utilized.

Figure 19:
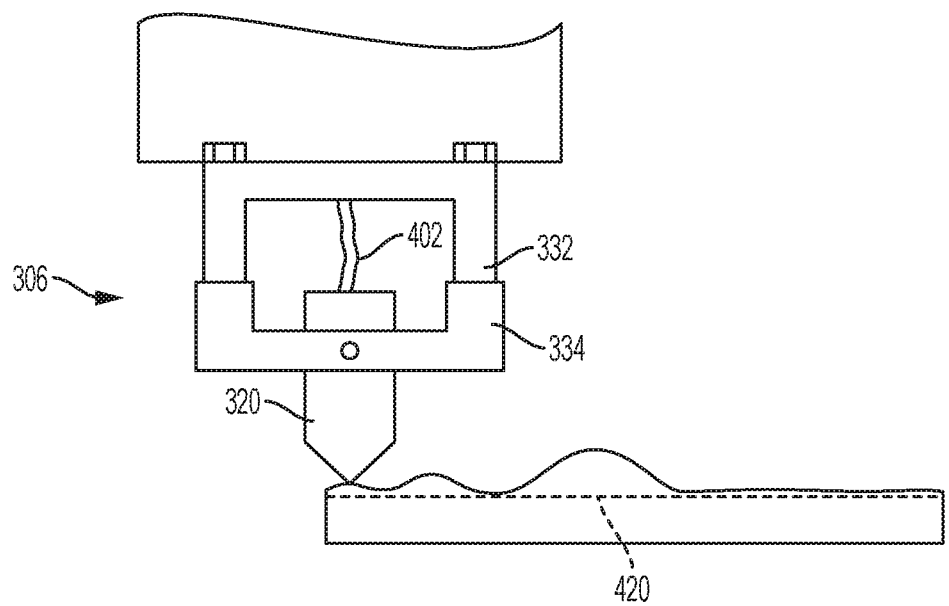
FIG. 19 is a schematic view of an embodiment of a printing assembly applying a print material to an article.
Figure 20:
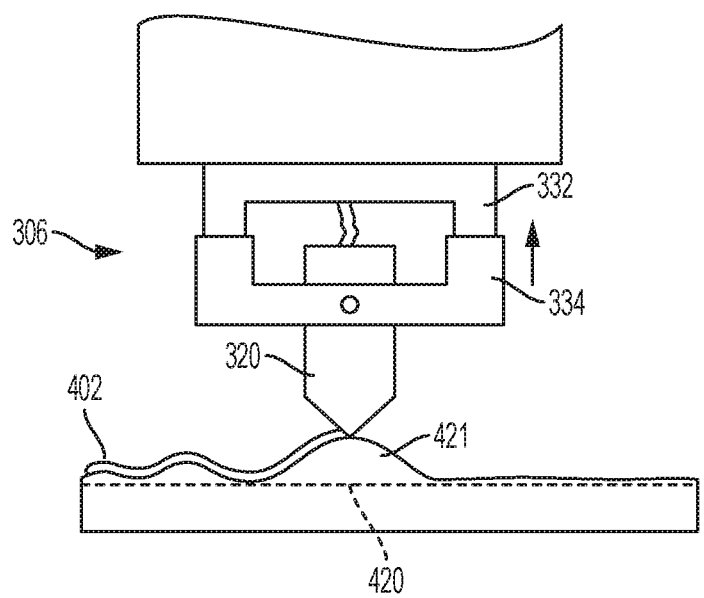
FIG. 20 is a schematic view of an embodiment of a printing assembly encountering an obstruction on the article.

Referring now to FIGS. 19 and 20, printing assembly 306 is shown in use. In similar configuration as printing assembly 106, printing assembly 306 may be configured to print or deposit composite yarn 402 along printhead path 420. As printhead 320 encounters obstructions, plurality of springs 350 may compress and force carriage 334 toward upper portion 332 of printing assembly 306. As shown in FIG. 20, printhead 320 encounters obstruction 421. In some embodiments, obstruction 421 may cause sufficient force upon printhead 320 in order to compress plurality of springs in a similar manner as with printing assembly 106.

Figure 21:
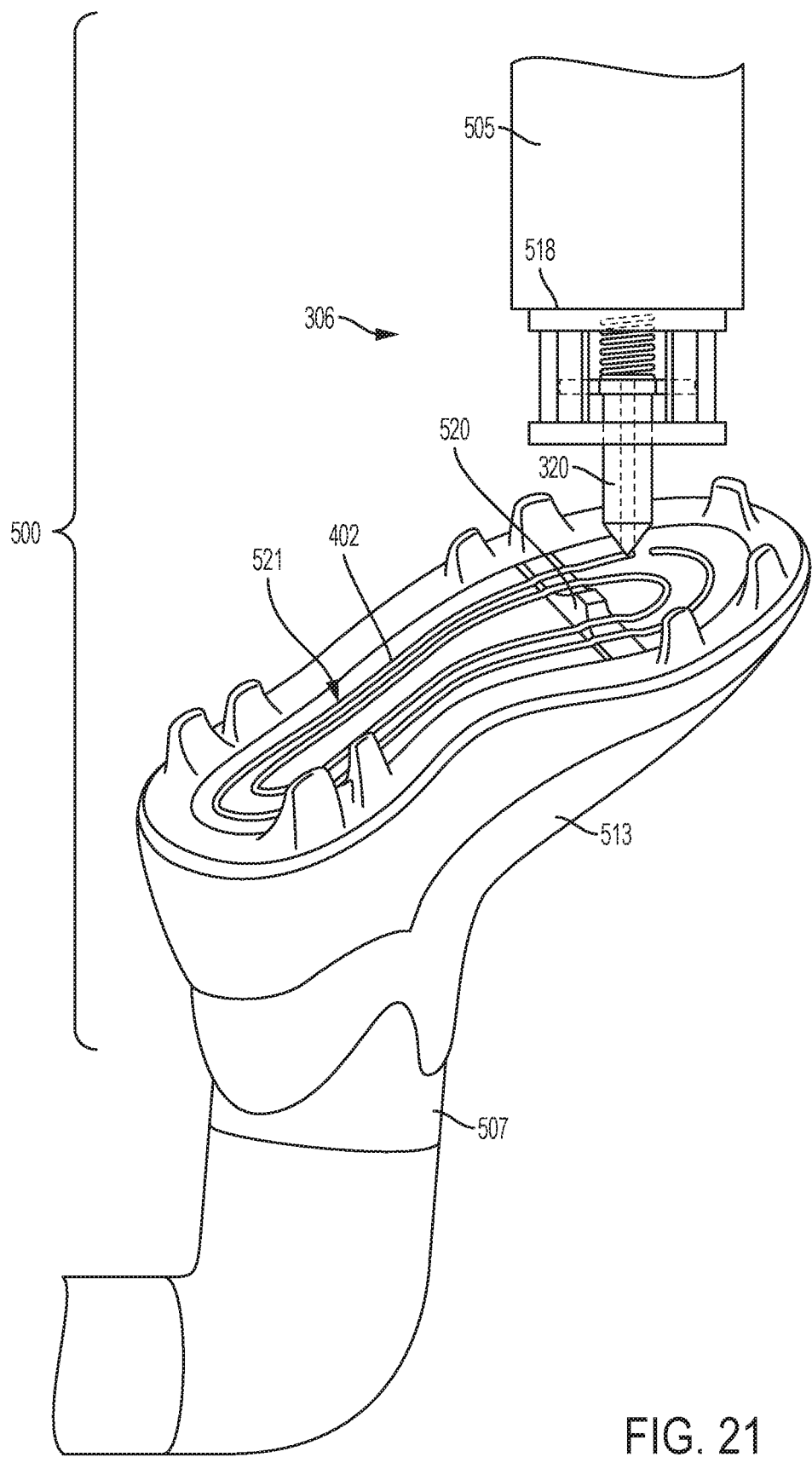
FIG. 21 is a schematic view of an embodiment of a printing system applying a print material onto an article.

Referring now to FIG. 21, a printing system is shown during use. As shown, printing system 500 includes printing assembly 306. Article of footwear 513 may be mounted on footwear receiving device 507. Additionally, footwear receiving device 507 may be attached or secured to article translating device 510 in a similar manner as discussed previously with respect to printing system 100. In some embodiments, printing assembly 306 may be attached to tool attachment portion 518 of print application device 505. In the embodiment as shown, article translating device 510 may have six degrees of freedom as discussed above with reference to article translating device 110. As article translating device 510 moves, article of footwear 513 may contact printhead 320 with sufficient force to cause the springs within printing assembly 306 to compress as printhead 320 deposits composite yarn 402 along article of footwear 513.

In some embodiments, an article of footwear may include varying topographical features. For example, article of footwear 513 includes ridge 520 that extends from a lateral side to a medial side of article of footwear 513. Ridge 520 may extend from the lower surface of article of footwear 513 such that as printhead 320 contacts ridge 520 with sufficient force, the springs within printing assembly 306 may compress and allow printhead 320 to move or translate over ridge 520 and deposit composite yarn 402 on ridge 520.

In some embodiments, print material may be deposited along various portions of article of footwear 513. In some embodiments, composite yarn 402 may be deposited along a sole structure. In other embodiments, composite yarn 402 may be deposited along an upper or other portions of article of footwear 513. As shown, composite yarn 402 is deposited along the sole structure of article of footwear 513. In some embodiments, composite yarn 402 may form reinforcement area 521. In some embodiments, reinforcement area 521 may be particularly formed to increase rigidity or stiffness along various portions of article of footwear 513. As shown, reinforcement area 521 is positioned in a central region of the sole structure of article of footwear 513. In other embodiments, reinforcement area 521 may be oriented or formed along other areas of article of footwear 513.

Figure 22:
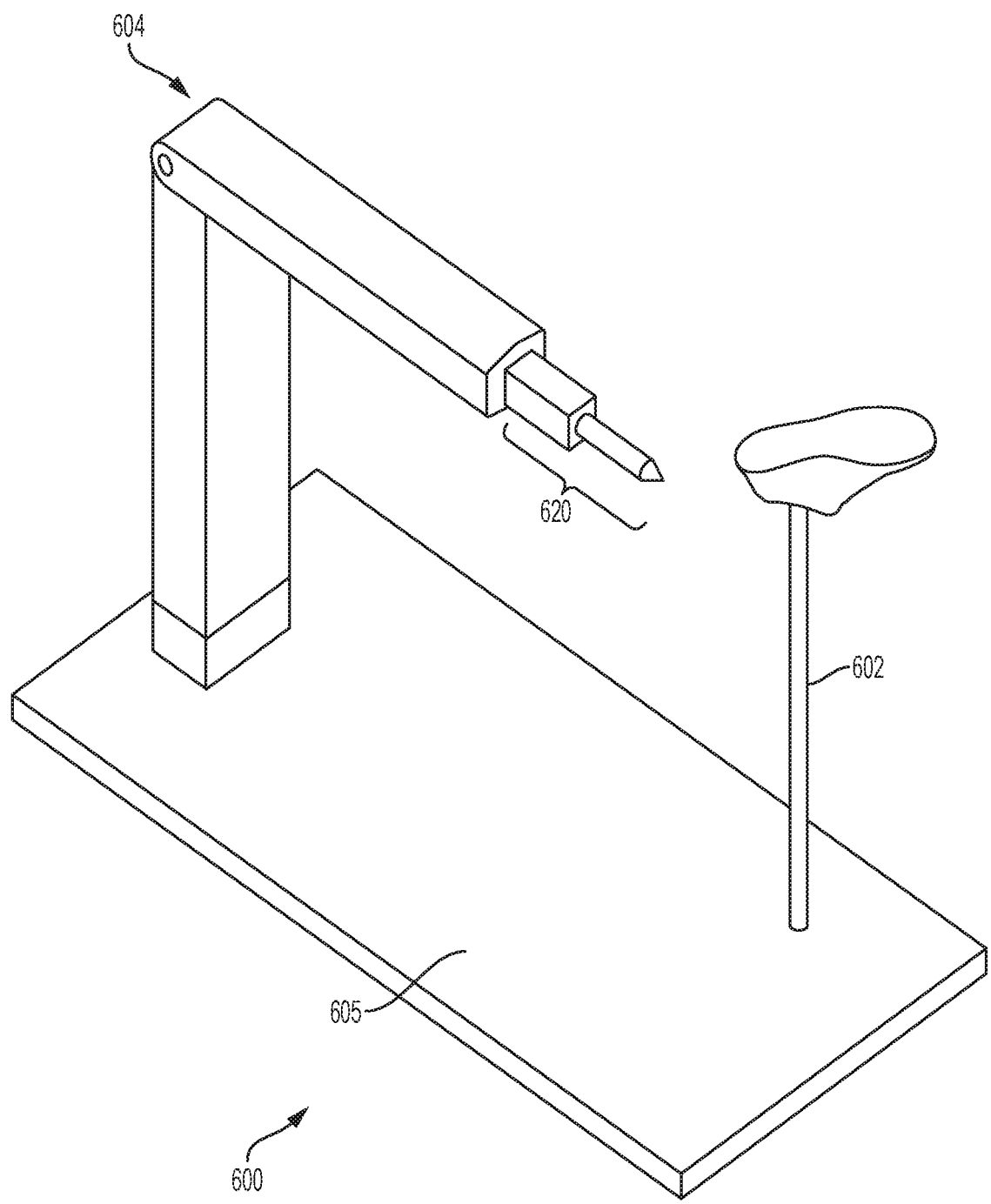
FIG. 22 is a schematic view of an alternate embodiment of a printing system.

Referring now to FIG. 22, an alternate embodiment of a printing system is depicted. Printing system 600 may include piece holder 602, actuating device 604, and frame 605. In some embodiments, piece holder 602 and actuating device 604 may be secured to frame 605.

In some embodiments, piece holder 602 may be configured to receive an article or articles to be printed upon. In some embodiments, piece holder 602 may hold an article of footwear or another article to be printed upon. In other embodiments, piece holder 602 may be configured to receive print material to form a piece or article. In the embodiment as shown, piece holder 602 may be stationary however, in other embodiments, piece holder 602 may be able to translate along or rotate about various axes.

In some embodiments, actuating device 604 may be configured to move about or translate along various axes. As shown in FIG. 22, actuating device 604 may have six degrees of freedom. In other embodiments, actuating device 604 may be stationary or may have various degrees of freedom. In some embodiments, actuating device 604 may include arm 606 and base 608. Base 608 may be secured to frame 605. In some embodiments, arm 606 may be configured to move with six degrees of freedom with respect to base 608. Because arm 606 may be able to move with six degrees of freedom, printing assembly 620 attached to arm 606 may also be configured to move with six degrees of freedom. Printing assembly 620 may be configured to deposit print material in a similar manner as with previously described printing assemblies.

In some embodiments, the nozzle structures disclosed herein can be modified to deliver a gas, such as heated air, to a surface of an article (e.g., footwear, clothing, apparel, and equipment). The gas can modify the structural and/or aesthetic characteristics of the portions of the surface that interact with the gas. For example, in some embodiments, the gas can be a heated gas that alters the structure of the material of the surface and/or welds multiple materials together.

Certain materials can be heat treatable, or embedded with heat treatable materials, so that when heat is applied to the material the structural and/or aesthetic characteristics of the material may change. For example, articles (e.g., articles of footwear, clothing, apparel, and equipment) can include thermoplastic or thermoset web adhesive materials, such thermoplastic polyurethane (TPU), embedded within portions of the material. When heated air is directed at portions of these materials, the materials or embedded materials can undergo certain changes, such as increased rigidity and/or other changes in structure and appearance. In some embodiments, two or more materials can be joined by hot air welding when a heated gas (e.g., hot air) is delivered to the surface where the two or more materials are positioned.

Figure 23:
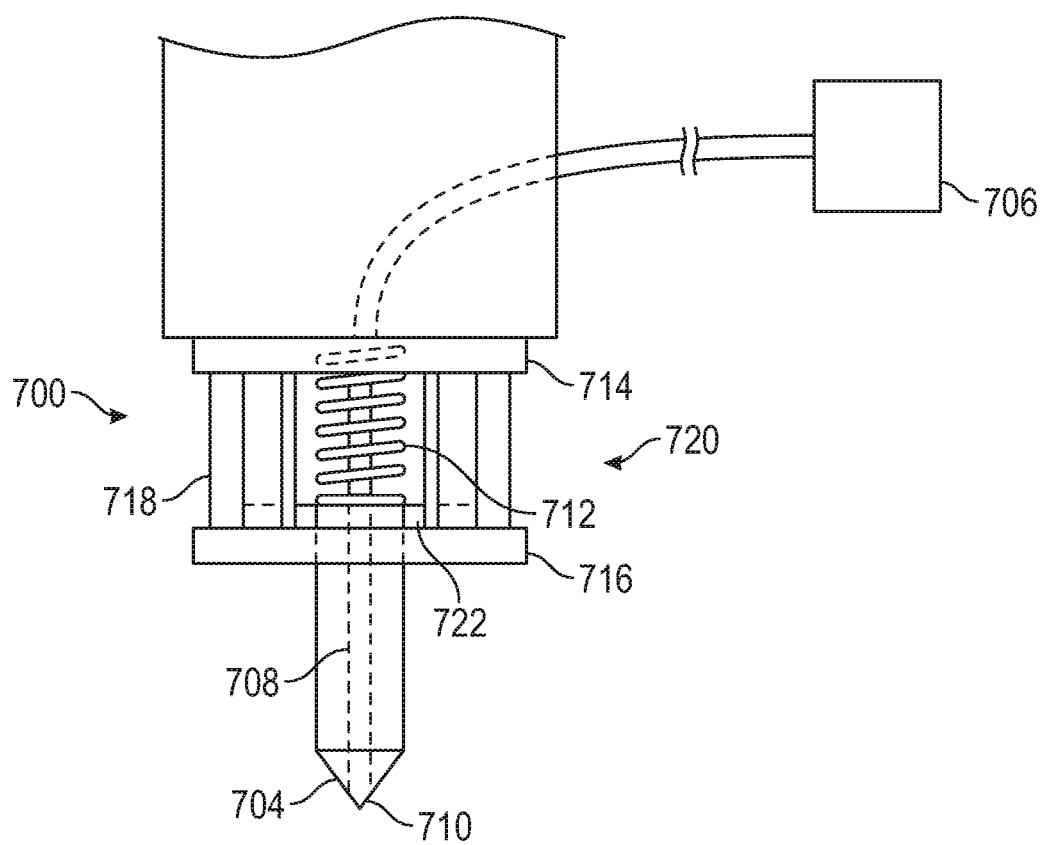
FIG. 23 is a schematic view of an embodiment of a gas nozzle assembly.

FIG. 23 illustrates an embodiment in which a gas nozzle assembly 700 includes a nozzle 704. In operation, gas nozzle assembly 700 can direct a gas (e.g., air) from a source 706 through a gas passageway 708 to an outlet 710 in nozzle 704. Source 706 can be, for example, any source capable of containing and/or delivering compressed air through a passageway. In some embodiments, source 706 can include a pump (e.g., an air compressor pump). When a pump is provided, the gas can be directed from source 706 through passageway 708 and outlet 710 by operation of the pump. Alternatively, or in addition to a pump, source 706 can include a container that stores a gas under pressure (e.g., a compressed gas tank). In operation, gas from the container can be released (e.g., by opening a valve) and directed through passageway 708 to outlet 710.

The gas delivered through outlet 710 can be heated (e.g., heated air). In embodiments where the gas is heated, one or more heating elements can be provided to elevate the temperature of the gas before it exits nozzle 704. Such heating elements can be provided at the location of source 706, at outlet 710, and/or at any other point between source 706 and outlet 710.

Nozzle 704 can be moveable in manners similar to those described herein with regard to the nozzles of printing assembly embodiments. In this regard, it should be understood that the nozzles and related structures in the printing assembly embodiments disclosed herein can be modified to include gas nozzles. For example, nozzle 704 shown in FIG. 23 is moveable in a similar manner to nozzle 120 shown in FIGS. 7-9.

Referring to FIG. 23, nozzle 704 is biased in an extended position via a spring 712. When an upward force is applied to nozzle 704 (or an adjacent structure, such as a bumper), spring 712 is compressed and nozzle 704 translates within a space (also referred to as a passageway) defined by an upper portion 714 and a lower portion 716 of a support structure 720. In this embodiment, spacing members 718 maintain the distance between upper portion 714 and lower portion 716, and a retaining portion 722, which is coupled to nozzle 704, moves between upper portion 714 and lower portion 716. Thus, like the nozzle of the printing assembly shown in FIGS. 7-9, nozzle 704 can move between a fully extended configuration and a fully retracted configuration.

Other features of the gas nozzle assembly 700 can be the same as in the printing assembly embodiments described herein. For example, the stroke length of the embodiment shown in FIG. 23 can vary in the same manner as other embodiments. Thus, as in other printing assembly embodiments, shorter spacing members can provide a shorter possible stroke length and longer spacing members can provide a longer possible stroke length. Similarly, the operation of the spring can be adjusted by selecting a spring with a designed spring constant to either increase or decrease the amount of force required to compress the spring during a gas delivery operation.

Figure 24:
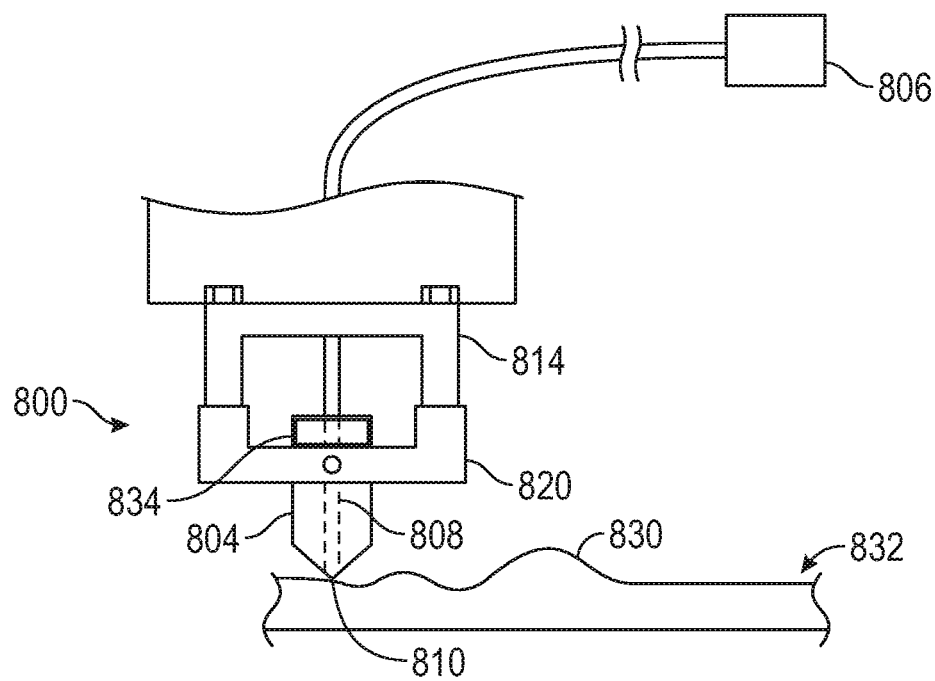
FIG. 24 is a schematic view of an embodiment of a gas nozzle assembly directing a gas to a surface of an article.
Figure 25:
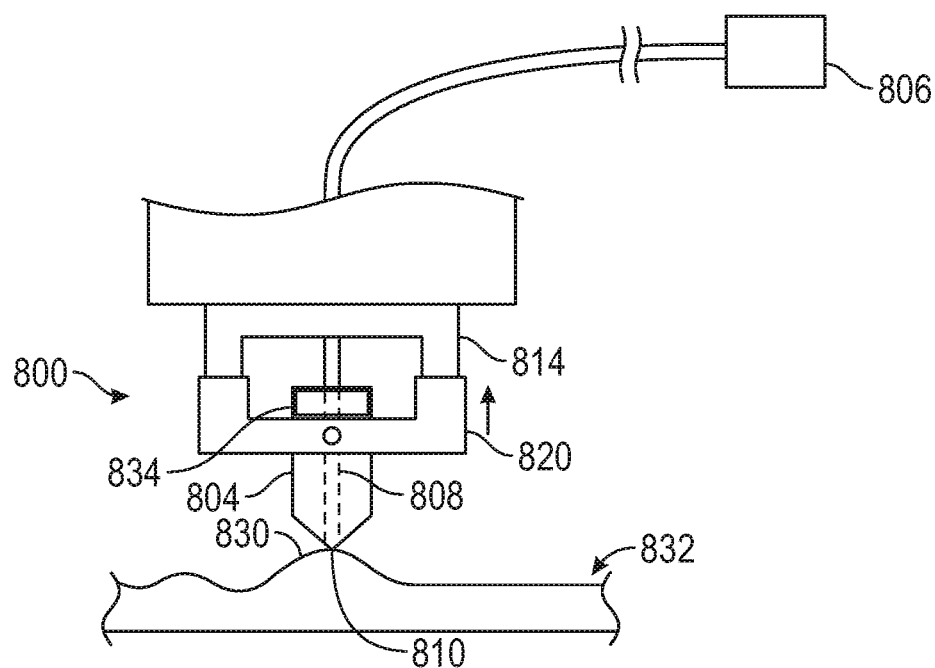
FIG. 25 is a schematic view of an embodiment of a gas nozzle assembly encountering an obstruction on the surface of the article.

FIGS. 24 and 25 illustrate another embodiment of a gas nozzle assembly 800. Gas nozzle assembly 800 includes a nozzle 804 with an outlet 810, and a support structure 820. Like the printing assembly embodiment shown in FIGS. 10-20, in this embodiment, support structure 820 is illustrated as a carriage that is movable relative to an upper portion 814.

FIG. 24 shows the gas nozzle assembly 800 in an extended configuration, and FIG. 25 shows the gas nozzle assembly 800 in a retracted configuration caused by contact of the nozzle 804 (or an adjacent surface, such as a bumper) with a surface 830 of an article 832 to which the gas (e.g., heated air) is being delivered. As in the embodiment of FIG. 23, the gas can be delivered from a source 806, through a passageway 808, and out of an outlet 810 in nozzle 804.

As shown in FIGS. 24-25, variations in the height of surface 830 can cause nozzle 804 to extend (FIG. 24), retract (FIG. 25), and move between the extended and retracted positions. This adjustment of the nozzle location can provide more consistent positioning of outlet 810 relative to surface 830, which can provide improved surface treatment by the gas. In addition, movement of nozzle 804 can reduce an amount of force on surface 830, which can reduce the potential for damage to the surface 830 by contact with nozzle 804 as nozzle 804 moves along surface 830.

As discussed above, one or more heating elements can be provided to heat the gas (e.g., air) to a desired delivery temperature. FIGS. 24 and 25 illustrate a heater 834 (e.g., a coil heater, induction heater, or other suitable heating device) positioned adjacent nozzle 804 to heat the gas as it is delivered through passageway 808. A heating element controller can be provided to adjust the temperature of the gas to a desired temperature for delivery at outlet 810. In addition, one or more temperature sensors can be provided at outlet 810 or elsewhere to provide information about the temperature of gas delivered at outlet 810.

In operation, gas nozzle assembly 800 can operate in the same general manner as the printing assembly described with respect to FIGS. 10-20. In particular, nozzle 804 can be secured to lower support 820 and can translate along a vertical axis as shown in FIGS. 24 and 25. As nozzle 804 (or an adjacent surface, such as a bumper) is contacted by a sufficient force, nozzle 804, along with lower support 820, can move upward relative to upper portion 814. This is in contrast to nozzle air assembly 700, where lower portion 716 remains stationary when nozzle 704 translates when subjected to sufficient to compress the spring.

As shown in FIG. 25, when nozzle 804 encounters an obstruction (e.g., an relative increase in a height of surface 830), that obstruction may cause sufficient force upon nozzle 804 in order to compress one or more springs of the gas nozzle assembly in a similar manner to that shown in FIGS. 15-18 with respect to a printing assembly embodiment.

The gas nozzle assemblies 700, 800 can deliver gas (e.g., heated air) to a surface of any of the articles disclosed herein. Features described in other embodiments that are not clearly limited to printing assemblies are equally applicable to gas nozzle assemblies. For example, the structures disclosed in FIGS. 1-2 (e.g., network 101, computing system 103, arm 104, and article translating device 110) can be utilized with a gas nozzle assembly that functions in a similar manner, except that the nozzle delivers gas. Thus, arm 104 can be modified to support a nozzle of a gas nozzle assembly, with arm 104 being able to twist, rotate, and translate such that the nozzle has six degrees of freedom. Similarly, the article that is to be treated by the gas nozzle assembly can be supported and positioned using an article translating device such as that shown in FIG. 1 (e.g., article translating device 110 with base 112 and arm 114).

In one embodiment, a gas nozzle assembly comprises a support structure including an upper portion and a lower portion, a passageway extending through the support structure from the upper portion to the lower portion, a nozzle having an outlet and a retaining portion, and a spring including a lower end that contacts an upper surface of the retaining portion of the nozzle.

The retaining portion can be on an opposite end of the outlet from the nozzle and located within the passageway of the support structure. The nozzle can translate through the passageway from an extended position to a retracted position, with the upper surface of the retaining portion being located closer to the upper portion of the support structure in the retracted position than in the extended position. The spring biases the nozzle to the extended position, and a portion of the spring can be disposed in the passageway. The nozzle deflects from the extended position toward the retracted position when the nozzle experiences a force sufficient to compress the spring.

A gas passageway can be provided that extends from the nozzle to a source. The gas passageway can be a tube or other structure that provides a fluid (e.g., gas) flow path between source and the nozzle. The source can be an air compressor pump and/or a compressed gas tank.

Other structures of the gas nozzle assembly can be similar to that as shown in FIGS. 1-9, but with printhead 120 (and its related printing structures) replaced by the nozzle 704 (and its related gas delivery structures) shown in FIG. 23.

In another embodiment, a gas nozzle assembly comprises a support structure and a carriage, a nozzle with an outlet, and a retaining portion coupled to the nozzle. The carriage includes a base portion, and an opening disposed through the base portion. The retaining portion can have an upper surface on an opposite end of the nozzle.

The nozzle is disposed through the opening of the base portion of the carriage and is secured to the base portion of the carriage such that the upper surface of the retaining portion and the nozzle are on opposite sides of the base portion. The support structure can include a set of rods that each include a through hole, and the carriage can include a set of sleeves that each include a through hole. Each rod of the set of rods can be disposed in a corresponding through hole of the set of sleeves. The carriage can translate from an extended position to a retracted position, with the upper surface of the retaining portion being located closer to the support structure in the retracted position than in the extended position.

A biasing member, such as a spring, can be located within each through hole of the set of sleeves. A fastener can be disposed through each of the set of rods and through each of the set of sleeves, with each fastener securing the support structure to the carriage. The biasing member (e.g., spring) can bias the carriage to the extended position and the support structure can deflect from the extended position toward the retracted position when the nozzle experiences a force sufficient to compress the spring.

Other structures of the gas nozzle assembly can be similar to that as shown in FIGS. 10-21, but with printhead 320 (and its related printing structures) replaced by the nozzle 804 (and its related gas delivery structures) shown in FIGS. 24-25.

While various embodiments have been described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combinations. Accordingly, the embodiments are not to be restricted except in light of the attached claims and their equivalents. Also, various modifications and changes may be made within the scope of the attached claims.

We claim:

1. A printing assembly, comprising:
a support structure;
the support structure including an upper portion and a lower portion;
a passageway extending through the support structure from the upper portion to the lower portion;
a printhead having a retaining portion and a nozzle, the retaining portion being on an opposite end of the printhead from the nozzle, the retaining portion being located within the passageway of the support structure;
a spring including a lower end that contacts an upper surface of the retaining portion of the printhead;
the printhead being able to translate through the passageway from an extended position to a retracted position, the upper surface of the retaining portion being located closer to the upper portion of the support structure in the retracted position than in the extended position;
the spring biasing the printhead to the extended position, a portion of the spring being disposed in the passageway;
a set of spacing members, the set of spacing members disposed between the upper portion of the support structure and the lower portion of the support structure, a length of the set of spacing members determining a distance between the upper portion and the lower portion, the distance between the upper portion and the lower portion corresponding to a stroke length of the printhead from the retracted position to the extended position;
wherein the printhead deflects from the extended position toward the retracted position when the nozzle experiences a force sufficient to compress the spring.

2. The printing assembly according to claim 1, wherein each spacing member of the set of spacing members includes a through hole; and
wherein each through hole of the set of spacing members is configured to receive a fastener that secures each spacing member of the set of spacing members to the upper portion of the support structure and secures each spacing member of the set of spacing members to the lower portion of the support structure.

3. The printing assembly according to claim 2, wherein the upper portion of the support structure includes a set of upper through holes, wherein each through hole in the set of upper through holes is aligned with a corresponding through hole in a spacing member of the set of spacing members;
wherein the lower portion of the support structure includes a set of lower through holes, wherein each through hole in the set of lower through holes is aligned with a corresponding through hole in a spacing member of the set of spacing members; and
wherein each fastener is positioned through an upper through hole in the set of upper through holes, a through hole in a spacing member of the set of spacing members and through a lower through hole in the set of lower through holes to secure the set of spacing members to the upper portion and to secure the lower portion to the set of spacing members.

4. The printing assembly according to claim 1, wherein:
each spacing member of the set of spacing members includes at least one planar side surface that extends between a lower end and an upper end of the spacing member of the set of spacing members;

the retaining portion of the printhead includes one or more planar engaging surfaces, each of the one or more planar engaging surfaces facing the at least one planar side surface of each spacing member of the set of spacing members; and wherein the one or more planar engaging surfaces of the printhead contact the planar side surface of each spacing member of the set of spacing members such that the printhead is restricted from rotating about a central axis of the printhead.

5. The printing assembly according to claim 1, wherein the upper portion of the support structure is configured with an attachment interface to be secured to an arm.

6. The printing assembly according to claim 1, wherein the distance traveled by the printhead in moving from the extended position to the retracted position is in a range between one millimeter and ten millimeters.

7. The printing assembly according to claim 1, wherein the lower portion of the support structure includes a guide hole extending from an upper surface of the lower portion to a lower surface of the lower portion;

the guide hole having a guide hole cross section, the nozzle having a nozzle cross section and a lower surface of the retaining portion having a retaining cross section;

the guide hole cross section being larger than the nozzle cross section allowing the nozzle to pass through the guide hole; and wherein the retaining cross section is larger than the guide hole cross section and prevents the retaining portion from passing through the guide hole.

8. A printing assembly, comprising:

a support structure and a carriage, the carriage including a base portion, and an opening disposed through the base portion;

a printhead having a retaining portion and a nozzle, the retaining portion having an upper surface on an opposite end of the printhead from the nozzle;

the printhead disposed through the opening of the base portion of the carriage and being secured to the base portion of the carriage such that the upper surface of the retaining portion and the nozzle are on opposite sides of the base portion;

the support structure including a set of rods, each rod of the set of rods including a through hole;

the carriage including a set of sleeves, each sleeve of the set of sleeves including a through hole;

each rod of the set of rods being disposed in a corresponding through hole of the set of sleeves;

the carriage being able to translate from an extended position to a retracted position, the upper surface of the retaining portion being located closer to the support structure in the retracted position than in the extended position;

a spring being located within each through hole of the set of sleeves, the spring biasing the carriage to the extended position; and a fastener disposed through each of the set of rods and through each of the set of sleeves, each fastener securing the support structure to the carriage;

wherein the support structure deflects from the extended position toward the retracted position when the nozzle experiences a force sufficient to compress the spring.

9. The printing assembly according to claim 8, wherein the fastener includes:

a threaded end and a head, the threaded end disposed through an upper surface of the support structure and the head being located along a lower surface of the carriage;

a nut disposed around the threaded end; and wherein rotating the nut changes the distance between the carriage and the support structure by changing a distance between the nut and the head of the fastener, the head of the fastener moving the lower portion relative to the support structure.

10. The printing assembly according to claim 8, wherein the support structure is configured with an attachment interface to be secured to an arm.

11. The printing assembly according to claim 8, wherein the base portion of the carriage has a triangular shape and wherein each sleeve of the set of sleeves is oriented adjacent a vertex of the carriage.

12. The printing assembly according to claim 8, wherein the base portion includes a securement through hole, wherein a fastener is disposed through the securement through hole and engages with the printhead and secures the printhead in place.

13. A system for orienting a printhead for multi-axial material dispensing, comprising:

an arm including a tool attachment portion;

a printing assembly attached to the tool attachment portion of the arm;

the printing assembly including a support structure;

the support structure including an upper portion and a lower portion;

the upper portion being attached to the tool attachment portion of the arm;

a passageway extending through the support structure from the upper portion to the lower portion;

the printing assembly further including a printhead;

the printhead having a retaining portion and a nozzle, the retaining portion being on an opposite end of the printhead from the nozzle, the retaining portion being located within the passageway of the support structure;

the printing assembly further including a spring;

the spring including a lower end that contacts an upper surface of the retaining portion of the printhead;

the printhead being able to translate through the passageway from an extended position to a retracted position, the upper surface of the retaining portion being located closer to the upper portion of the support structure in the retracted position than in the extended position;

the spring biasing the printhead to the extended position, and a portion of the spring being disposed in the passageway;

wherein the printhead deflects from the extended position toward the retracted position when the nozzle experiences a force sufficient to compress the spring;

the system further comprising an article translating device, the article translating device including a base and an arm, an article receiving platform being secured to the arm of the article translating device, the article receiving platform being able to move in three dimensions with respect to the base of the article translating device;

a set of spacing members, the set of spacing members disposed between the upper portion of the support structure and the lower portion of the support structure;

a length of the set of spacing members determining a distance between the upper portion and the lower portion; and the distance between the upper portion and the lower portion corresponding to a stroke length of the printhead from the retracted position to the extended position.

14. The system according to claim 13, wherein each spacing member of the set of spacing members includes a through hole; and
wherein each through hole of the set of spacing members is configured to receive a fastener that secures each spacing member of the set of spacing members to the upper portion of the support structure and secures each spacing member of the set of spacing members to the lower portion of the support structure.

15. The system according to claim 14, wherein the upper portion of the support structure includes a set of upper through holes, wherein each through hole in the set of upper through holes is aligned with a corresponding through hole in a spacing member of the set of spacing members;
wherein the lower portion of the support structure includes a set of lower through holes, wherein each through hole in the set of lower through holes is aligned with a corresponding through hole in a spacing member of the set of spacing members; and
wherein each fastener is positioned through an upper through hole in the set of upper through holes, a through hole in a spacing member of the set of spacing members and through a lower through hole in the set of lower through holes to secure the set of spacing members to the upper portion and to secure the lower portion to the set of spacing members.

16. The system according to claim 13, wherein:
each spacing member of the set of spacing members includes at least one planar side surface that extends between a lower end and an upper end of the spacing member of the set of spacing members;
the retaining portion of the printhead includes one or more planar engaging surfaces, each of the one or more planar engaging surfaces facing the at least one planar side surface of each spacing member of the set of spacing members; and
wherein the one or more planar engaging surfaces of the printhead contact the planar side surface of each member of the set of spacing members such that the printhead is restricted from rotating about a central axis of the printhead.

17. The system according to claim 13, wherein the lower portion of the support structure includes a guide hole extending from an upper surface of the lower portion to a lower surface of the lower portion;
the guide hole having a guide hole cross section, the nozzle having a nozzle cross section and a lower surface of the retaining portion having a retaining cross section;
the guide hole cross section being larger than the nozzle cross section allowing the nozzle to pass through the guide hole; and
wherein the retaining cross section is larger than the guide hole cross section and prevents the retaining portion from passing through the guide hole.

18. The system according to claim 13, wherein the printhead includes an inflow opening and an outflow opening, a print material passing from the inflow opening to the outflow opening.

19. The apparatus of any of claim 13, wherein the distance traveled by the printhead in moving from the extended position to the retracted position is in a range between one millimeter and ten millimeters.

20. A system for orienting a printhead for multi-axial material dispensing, comprising:
an arm including a tool attachment portion;
a printing assembly attached to the tool attachment portion of the arm;
the printing assembly including a support structure and a carriage;
the carriage including a base portion, and an opening disposed through the base portion;
the printing assembly further including a printhead;
the printhead having a retaining portion and a nozzle, the retaining portion having an upper surface on an opposite end of the printhead from the nozzle;
the printhead disposed through the opening of the base portion of the carriage and being secured to the base portion of the carriage such that the upper surface of the retaining portion and the nozzle are on opposite sides of the base portion;
the support structure including a set of rods, each rod of the set of rods including a through hole;
the carriage including a set of sleeves, each sleeve of the set of sleeves including a through hole;
each rod of the set of rods being disposed in a corresponding through hole of the set of sleeves;
the carriage being able to translate from an extended position to a retracted position, the upper surface of the retaining portion being located closer to the support structure in the retracted position than in the extended position;
a spring being located within each through hole of the set of sleeves;
a fastener disposed through each of the set of rods and through each of the set of sleeves, each fastener securing the support structure to the carriage;
the spring biasing the carriage to the extended position; and
wherein the support structure deflects from the extended position toward the retracted position when the nozzle experiences a force sufficient to compress the spring.

21. The system according to claim 20, wherein the fastener includes:
a threaded end and a head, the threaded end disposed through an upper surface of the support structure and the head being located along a lower surface of the carriage;
a nut disposed around the threaded end; and
wherein rotating the nut changes the distance between the carriage and the support structure by changing a distance between the nut and the head of the fastener, the head of the fastener moving the carriage relative to the upper portion.

* * * * *